US005180953A

United States Patent [19]

Hirata et al.

[11] Patent Number: 5,180,953

[45] Date of Patent: Jan. 19, 1993

[54] STROBO DEVICE

[75] Inventors: Shinji Hirata, Toyonaka; Kazuo Tanaka, Neyagawa, both of Japan

[73] Assignee: West Electric Co., Ltd., Osaka, Japan

[21] Appl. No.: 799,459

[22] Filed: Nov. 26, 1991

[30] Foreign Application Priority Data

| | | | |
|---|---|---|---|
| Nov. 26, 1990 | [JP] | Japan | 2-323570 |
| Jan. 24, 1991 | [JP] | Japan | 3-7020 |
| Aug. 14, 1991 | [JP] | Japan | 3-204191 |
| Aug. 30, 1991 | [JP] | Japan | 3-219894 |
| Aug. 30, 1991 | [JP] | Japan | 3-219896 |

[51] Int. Cl.[5] .......... G03B 15/00

[52] U.S. Cl. .......... 315/241 S; 354/413

[58] Field of Search .......... 315/241 R, 241 P, 241 S; 354/413, 416, 417

[56] References Cited

U.S. PATENT DOCUMENTS

| | | | |
|---|---|---|---|
| 4,839,686 | 6/1989 | Hosomizu et al. | 354/416 |
| 5,004,958 | 4/1991 | Hirata | 315/241 S |
| 5,034,662 | 7/1991 | Nishida et al. | 315/241 S |

*Primary Examiner*—Robert J. Pascal
*Attorney, Agent, or Firm*—Panitch Schwarze Jacobs & Nadel

[57] ABSTRACT

A strobo device in accordance with the present invention is provided with an insulated gate bipolar transistor connected to a flash discharge tube in series and a step-up capacitor to step up a voltage between the main electrodes of the flash discharge tube in the luminous operation. The step-up capacitor is connected so that a terminal on the side connected to a cathode of the flash discharge tube can have a high potential and the step-up capacitor is also connected so as to be charged by a current flowing through the flash discharge tube, which is not flashing. Thus the device realizes a rapid charging of the step-up capacitor. In this way a high voltage, at least more than twice as high as the charged voltage of the main capacitor, can be applied between the main electrodes of the flash discharge tube in the luminous operation, resulting in preventing flash failures during the repeating high-speed luminous emissions.

22 Claims, 9 Drawing Sheets

STROBO DEVICE

BACKGROUND OF THE INVENTION

1. Field of the Invention

The present invention relates to a strobo device wherein a flash discharge tube is connected in series to an insulated gate bipolar transistor which controls the luminous operation of the discharge tube, and more particularly to a strobo device having effective characteristics in a voltage supply system to the flash discharge tube in case of high-speed repeating luminous emissions.

2. Description of the Prior Art

A strobo device utilizing an Insulated Gate Bipolar Transistor (hereinafter called the IGBT) is known as disclosed in U.S. Pat. No. 4,839,686.

As shown in FIG. 12, the device consists of a DC high voltage power supply 1 which is known DC-DC converter circuit, a main capacitor 2 which is charged by the power supply 1, a constant-voltage circuit 3 which is placed adjacent to the power supply 1 and supplies a flash control circuit 7 described later with a constant-voltage, a known trigger circuit 4 which triggers a flash discharge tube 5, a control circuit 6 which is connected to a control means 8 in a camera body, and receives and sends different output signals such as a trigger signal to actuate the trigger circuit 4, a flash control circuit 7 which controls an on/off operation of the IGBT connected in series to the flash discharge tube 5 and also controls a light emission of the flash discharge tube 5, and a multiplying circuit 9 which applies a doubled voltage of the charged voltage of the main capacitor 2 between main electrodes of the flash discharge tube 5.

In the above device, when the DC high voltage power supply 1 is started by turning a switch Sw on, the main capacitor 2 and the multiplying capacitor 9*a* are charged forward by a high voltage output by the DC high voltage power supply 1. A capacitor for a power supply Ce supplying power to the control circuit 6 is charged by a low voltage power supply E, and a capacitor 3*a* of the constant-voltage circuit 3 is also charged. In this way, the control circuit 6 is actuated and the flash control circuit 7 is ready for the luminous operation.

At this time, the control circuit 6 outputs a high level signal by inputting a flash start signal from the control means 8 and turns on transistors Qa and Qb in the flash control circuit 7. Then the IGBT is turned on by charged voltage of the capacitor 3*a*. Thus the charged voltage of the multiplying capacitor 9*a* superimposed on that of the main capacitor 2 is applied between the main electrodes of the flash discharge tube 5 and actuates the trigger circuit 4. In this way, the flash discharge tube 5 flashes by using the charged electricity of the main capacitor 2.

In the above flashing procedure, when a flash stop signal is input in the control circuit 6 by the control means 8, the control circuit 6 is actuated, outputs a high level signal from an output terminal Ob and turns on transistors Qc and Qd of the flash control circuit 7, which turns off the transistor Qb and the IGBT which have been on, resulting in stopping the luminous operation of the flash discharge tube 5.

Described above is a basic function of the conventional device shown in FIG. 12. During the luminous operation by the device, a doubled voltage of the main capacitor 2, a superimposed voltage of the charged voltage of the multiplying capacitor 9*a* and the main capacitor 2, is applied between the main electrodes of the flash discharge tube 5. Thus the strobo device of the invention differs from the conventional device, in which the luminous operation is stopped by a commutating capacitor, in preventing the flashover, thereby obtaining a small-size device realizing repeating luminous operations at a high speed.

However, in the process of the high-speed luminous emission, when the period is over a specified one, for example, more than several ten Hz in the device shown in FIG. 12, the next luminous emission may be actuated before the multiplying capacitor 9*a* is sufficiently charged. In this case the multiplying circuit 9 may not function appropriately, resulting in failing to flash the flash discharge tube 5, and flash failures are likely to happen.

For example, it is evident from the circuit structure that the multiplying capacitor 9*a* is charged only when a cathode of the flash discharge tube 5 has a low potential.

FIGS. 13*a*, 13*b* and 13*c* are diagrams showing voltage waveforms and flash waveforms at predetermined points, points A and B in FIG. 12, in the luminous operation in a conventional device. As shown in FIG. 13*a*, when a high level voltage is applied to the points A, a gate of the IGBT, at a time T1 and the applying voltage is stopped at a time T2, the IGBT is turned on and then off as mentioned above, therefore, the flash discharge tube 5 flashes as shown in FIG. 13*c*. A potential of the point B, which is a cathode of the flash discharge tube 5, (a cathode potential) in the above procedure once falls sharply at the time T1, then rises sharply at the time T2 and gradually falls hereafter as shown in FIG. 13*b*.

It is known that the flash discharge tube 5 doesn't return to a steady state immediately after the IGBT is turned off at T2 but is in the ionization state in which the tube doesn't flash. Once the flash discharge tube 5 flashes, the cathode potential is kept at a high level until the flash discharge tube 5 returns to the initial state through the ionization state, even if the power supply is stopped. Accordingly, the multiplying capacitor doesn't start to be charged from the time T2. While the flash discharge tube 5 is in the ionization state and the cathode potential is kept at a high level, the multiplying capacitor 9*a* does not become charged. Therefore, even if a high level voltage is applied to the point A at the time T3 before the cathode voltage does not return to level 0, the charged voltage of the multiplying capacitor 9*a* can not be applied to the flash discharge tube 5, as shown in FIG. 13*a* by a broken line.

Moreover, the multiplying capacitor 9*a* has an appropriate electric charge time constant, therefore, it is not sufficiently charged during the time constant even after the cathode potential returns to level 0. Therefore, the multiplying circuit 9 can not fully function before the time constant is completed, even if the next luminous operation is carried out. For example, when the flash discharge tube 5 flashes with a period range of more than several ten Hz so many times that the charged voltage of the main capacitor 2 is reduced, the luminous failures occur in the flash discharge tube 5 and the luminous emission disadvantageously can not follow the desired period in the above period range.

It is known that in the case of a very high period, more than the above period range, the flash discharge tube 5 flashes very easily, resulting in no luminous failures, as the next luminous operation is carried out when the flash discharge tube 5 can flash without being triggered.

On the other hand, in order to miniaturize the flash discharge tube and increase the quantity of flashing light, a method to make the impedance high by a high inside gas pressure is known. It is also known that a starting voltage of the flash discharge tube can be risen by this method. In addition, when the luminous emissions are repeated at a high speed, a characteristic of the outgoing radiation is deteriorated by miniaturization, and a characteristic of storing heat is risen by the high impedance, which further rises the starting voltage. From these points of view it is a big disadvantage for the flash discharge tube that the multiplying circuit can not be expected to function.

SUMMARY OF THE INVENTION

The strobo device of this invention, which overcomes the above-discussed and numerous other disadvantages and deficiencies of the prior art, comprises a DC high voltage power supply, a main capacitor connected to both ends of the DC high voltage power supply, first series connection elements consisting of a flash discharge tube, a first diode and an IGBT connected in series, the first series connection elements being connected to both ends of the main capacitor and forming a discharge passage of the main capacitor via the flash discharge tube, second series connection elements consisting of a control switch element with a control polarity and a second diode connected in series, the second series connection elements being connected to the series elements of the first diode and the IGBT, a step-up capacitor connected between a cathode of the first or a third diode and an anode of the second diode, a change means to charge the step-up capacitor so as to give a high potential to a terminal on the side connected to the cathode of the flash discharge tube, a control means to control an on action of the control switch element in response to a flash start signal, a drive control means to turn on the IGBT by supplying the on-state voltage to the control polarity of the IGBT in response to a flash start signal or by starting the DC high voltage power supply and turn off the IGBT by stopping supplying the on-state voltage in response to a flash stop signal, and a trigger circuit by which the flash discharge tube is exited.

Thus, the invention described herein makes possible the objectives of (1) providing a strobo device having an IGBT in which flash failures are prevented in the repeating luminous operations at a high speed with a period range of more than several ten Hz, (2) providing a strobo device in which the next luminous emission is ensured by realizing a high speed charge of a step-up capacitor to step up a voltage between the main electrodes of a flash discharge tube in the luminous operation, and by applying a voltage more than twice as high as the charged voltage of a main capacitor between the main electrodes of the flash discharge tube in the next luminous operation, and (3) providing a strobo device in which a small flash discharge tube with a high impedance can be adopted by preventing flash failures.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
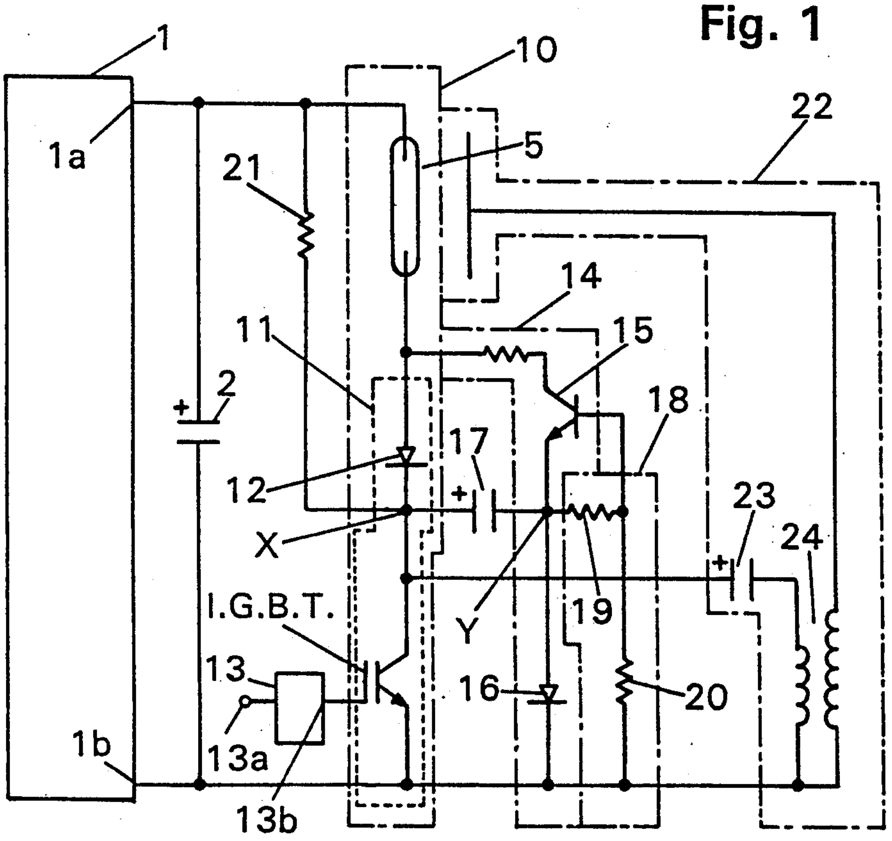
FIG. 1 is a circuit describing the first embodiment of a strobo device in accordance with the present invention.

All the same reference numerals and signs used throughout FIGS. 1 to 12 indicate the same function elements.

FIG. 1 is a circuit showing the first embodiment of the strobo device in accordance with the invention.

A main capacitor 2 is connected to both ends of a DC high voltage power supply 1 consisting of a known DC-DC converter circuit, a layered power supply and the like. Both ends of the main capacitor 2 are connected to first series connection elements 10, which consist of series elements 11 including a first diode 12 and an IGBT, and a flash discharge tube 5 in series, and which form a discharge passage of the main capacitor 2 via the flash discharge tube 5. A gate of the IGBT is connected to an output terminal 13*b* of a drive control circuit 13 controlling the conducting procedure of the IGBT. The same circuit as used in the conventional circuit shown in FIG. 12, that is, a circuit actuated in response to a flash start/stop signal supplied to an input terminal 13*a* and having such a system as to turn on the IGBT only in the luminous operation, is adopted as the driver control circuit 13. Second series connection elements 14 connected in series with a resistance without a reference numeral which is controlled to be used at need, a transistor 15 which is a first control switch element with a control polarity and a second diode 16 are connected to both ends of the series elements 11. A step-up capacitor 17 is connected in the middle of a connection X between the first diode 12 and the IGBT and a connection Y between the transistor 15 and the second diode 16. A discharge circuit 18 consisting of resistances 19 and 20 and forming a discharge passage of the step-up capacitor 17 via the IGBT is connected to both ends of the second diode 16. The discharge circuit 18 works as a gate means to turn on the transistor 15 by supplying the starting voltage to a base which is a control polarity of the transistor 15. A charge resistance 21 forms a charge means together with the second diode 16 to charge the step-up capacitor 17 so as to give a high potential to the terminal connected to the first diode, namely a terminal on the side connected to cathode of the flash discharge tube 5. A trigger circuit 22 consisting of a trigger capacitor 23 and a trigger transformer 24 is formed on both ends of the IGBT. This trigger circuit 22 excites the flash discharge tube 5 by the discharge of the trigger capacitor 23 via the trigger transformer 24 by turning on the IGBT.

The operation of the first embodiment of the strobo device in accordance with the present invention shown in FIG. 1 will now be described in detail. The DC high voltage power supply 1 is actuated by an appropriate switch or the like (not shown). The main capacitor 2 is charged forward by the DC high voltage output between output terminals 1*a* and 1*b*. At the same time, the step-up capacitor 17 and the trigger capacitor 23 are charged forward so as to give a high potential to the terminal on the side connected to the cathode of the flash discharge tube 5 via the first diode 12 via charge means such as a charge resistance 21 and the second diode 16, or the charge resistance 21 and the trigger transformer 24, respectively.

At an appropriate time after the main capacitor 2 and the like are charged, a flash start signal is supplied to the input terminal 13*a* of the drive control circuit 13, when a high level pulse signal is applied to the gate of the IGBT from the output terminal 13*b*, turning the IGBT on. Then the flash discharge tube 5 is excited by the trigger circuit 22. Charged electricity of the step-up capacitor 17 is discharged via the IGBT and the discharge circuit 18, which is a gate means of the transistor 15. Then a dropped voltage of the resistance 19, forming the discharge circuit 18, is applied between a base and an emitter of the transistor 15, turning the transistor 15 on. The charged voltage of the step-up capacitor 17 is applied between the main electrodes of the flash discharge tube 5 via the IGBT, the main capacitor 2 and the transistor 15. Therefore, a doubled voltage of the charged voltage of the main capacitor 2, namely, a superimposed voltage of the charged voltage of the main capacitor 2 and the step-up capacitor 17, is applied between the main electrodes of the flash discharge tube 5. As a result, the flash discharge tube 5 starts the luminous operation easily and flashes by use of the charged electricity of the main capacitor 2 from the time the IGBT is turned on.

When a flash stop signal is supplied to the input terminal 13*a* of the drive control circuit 13 at an appropriate time during the luminous operation of the flash discharge tube 5, the drive control circuit 13 stops outputting the high level pulse signals output from the output terminal 13*b* and turns the IGBT off. Then, the discharge current flowing through the flash discharge tube 5 is cut off and the flash discharge tube 5 stops flashing and returns to the initial state through the ionization state. At this time a discharge loop of the step-up capacitor 17 via the IGBT and the transistor 15 and a discharge loop of the trigger capacitor 23 via the IGBT and the trigger transformer 24 are cut off, making the step-up capacitor 17 and the trigger capacitor 23 ready to be charged.

As a result, when the flash discharge tube 5 is in the ionization state, a current flows through a loop consisting of the main capacitor 2, the flash discharge tube 5, the first diode 12, the step-up capacitor 17 and the second diode 16, and a loop consisting of the main capacitor 2, the flash discharge tube 5, the first diode 12, the trigger capacitor 23 and the trigger transformer 24. This means that the step-up capacitor 17 and the trigger capacitor 23 are charged.

In this charging operation, the terminals of the step-up capacitor 17 and the trigger capacitor 23 on the side connected to the cathode of the flash discharge tube 5 are charged with a high potential. The charging operation starts at the same time when the IGBT is turned off, namely when the flash discharge tube 5 is in the ionization state with a high cathode potential, and is carried out via the flash discharge tube 5 in the ionization state, the first diode, the second diode or the trigger transformer 24. Therefore, the electric charge time constant of the charge means is very small.

In other words, the step-up capacitor 17 and the trigger capacitor 23 are immediately charged at the same time when the IGBT is turned off, and the next luminous operation is ready to be carried out. As a result, in the case of the repeating luminous operation with a high period of more than several ten Hz, when the IGBT is turned on the next time, the charged voltage of the step-up capacitor 17 superimposed on the charged voltage of the main capacitor 2 can always be applied between the main electrodes of the flash discharge tube 5. Therefore, the luminous emissions of a high period can be repeated without failures, and a miniaturized flash discharge tube with a high impedance can be adopted.

Figure 2:
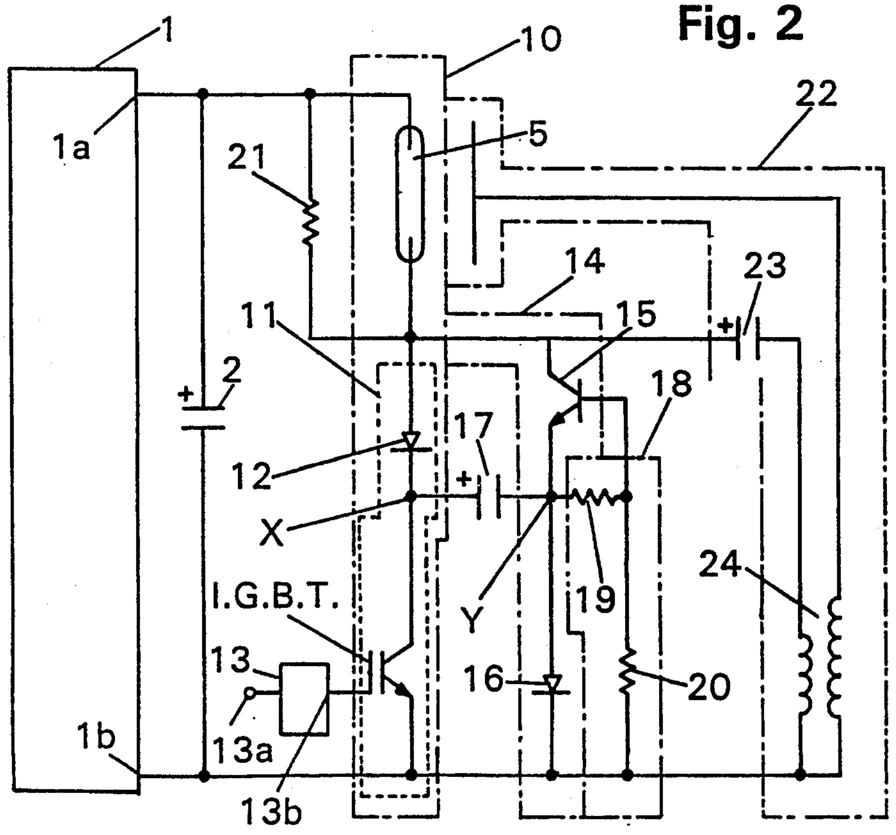
FIG. 2 is a circuit describing the second embodiment of a strobo device in accordance with the present invention.

FIG. 2 is a circuit showing the second embodiment of the strobo device in accordance with the present invention.

In the second embodiment positions of the charge resistance 21 and the trigger circuit 22 in the first embodiment are changed: One end of the charge resistance 21 is connected to a connection between the flash discharge tube 5 and the first diode 12, and the trigger circuit 22 is formed at both ends of the second series elements 14 so that the trigger capacitor 23 can be discharged via the transistor 15.

The procedure of the second embodiment will now be described, but the operation as a strobo device is approximately the same as that of the first embodiment.

When the main capacitor 2, the step-up capacitor 17 and the trigger capacitor 23 are charged forward by the DC high voltage power supply 1, a flash start signal is supplied, and then the IGBT is turned on by the drive control circuit 13 as in the first embodiment. In this embodiment, at the time the IGBT is turned on, the charged electricity of the step-up capacitor 17 is discharged via the IGBT and the discharge circuit 18, and the flash discharge tube 5 is not immediately excited by the trigger circuit 22, which is the difference from the first embodiment.

The transistor 15 is turned on by the dropped voltage of the resistance 19 produced by the above discharge. At this time the trigger circuit 22 is actuated by the discharge of the trigger capacitor 23 via the trigger transformer 24. In this way the flash discharge tube 5 is applied a high superimposed voltage of the charged electricity of the main capacitor 2 and the step-up capacitor 17 between the main electrodes via the transistor 15 and the IGBT, and the flash discharge tube 5 is excited. Then the flash discharge tube flashes by using the charged electricity of the main capacitor 2.

In the luminous operation of the flash discharge tube 5, when the flash stop signal is supplied, the IGBT is turned off by the drive control circuit 13, and the flash discharge tube 5 stops flashing as in the first embodiment. At this time the step-up capacitor 17 and the trigger capacitor 23 are ready to be charged. Then the flash discharge tube 5 returns to the initial state through the ionization state. The step-up capacitor 17 and the trigger capacitor 23 are immediately charged via the flash discharge tube 5 in the ionization state. As a result, the second embodiment can obtain the same functions and effects as in the first embodiment.

Figure 3:
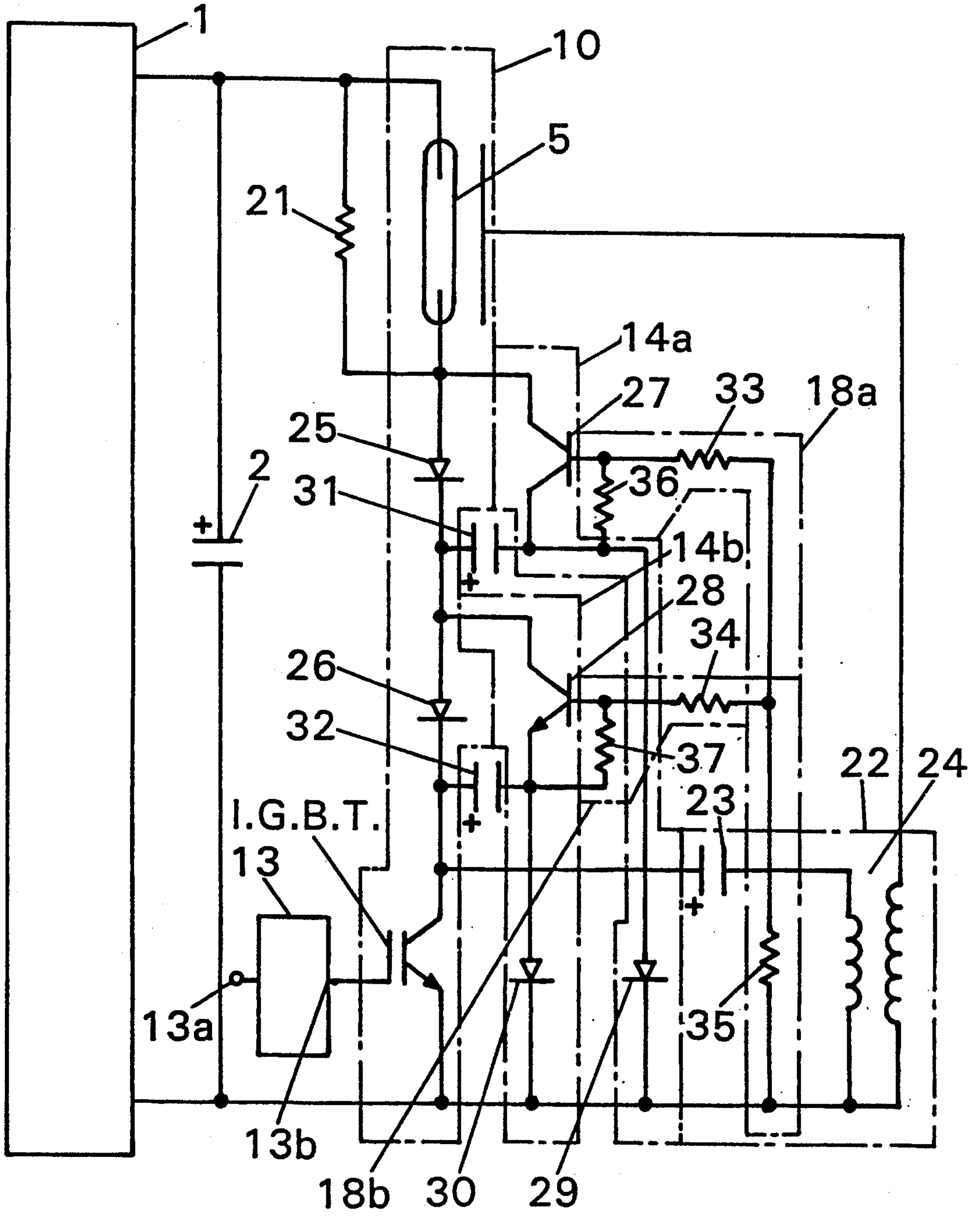
FIG. 3 is a circuit describing the third embodiment of a strobo device in accordance with the present invention.

FIG. 3 is an electric circuit showing the third embodiment of the strobo device in accordance with the present invention.

In the third embodiment, a voltage three times as high as the charged voltage of the main capacitor 2 is applied between the main electrodes of the flash discharge tube 5. The first series connection elements 10 forming a discharge loop of the main capacitor 2 via the flash discharge tube 5 consist of the flash discharge tube 5, two first diodes 25 and 26 and the IGBT as shown in FIG. 3. The first diode 25 is connected to the second series connection elements 14*a* consisting of a transistor 27 and a second diode 29. The first diode 26 is connected to the second series connection elements 14*b* consisting of a transistor 28 and a second diode 30. Step-up capacitors 31 and 32 are connected between the cathodes of the first diodes 25 and 26 and the emitters of the transistors 27 and 28, respectively. The discharge circuits 18*a* and 18*b* forming discharge passages of the step-up capacitors 31 and 32 via the IGBT and by resistances 33, 34 and 35 connected between the bases of the transistors 27 and 28 and the emitter of the IGBT, and resistances 36 and 37 connected between the bases and the emitters of the transistors 27 and 28, respectively. These discharge passages 18*a* and 18*b* supply the bases, the control polarities, of the transistors 27 and 28 with the starting voltage, as the discharge circuit 18 in the first and the second embodiments, and work as gate means to turn on the transistors 27 and 28. The trigger circuit 22 is connected to both ends of the IGBT, the charge resistance 21 is connected to both ends of the flash discharge tube 5 and the drive control circuit 13 is connected to the gate of the IGBT, as in the previous embodiments. One end of the charge resistance 21 which is connected to the cathodes of the flash discharge tube 5 may be connected to the cathode of the first diode 25.

The operation of the third embodiment, mainly the difference from the first and second embodiments will now be described. When the DC high voltage power supply 1 starts, the main capacitor 2 is charged forward as in the previous embodiments. At the same time, the step-up capacitors 31 and 32 are charged forward so as to give a high potential to the terminal on the cathode side of the flash discharge tube 5 via the charge resistance 21, the first diode 25, the second diode 29 or the first diode 26 and the second diode 30. The trigger capacitor 23 is also charged forward via the charge resistance 21, the first diode 25, the second diode 29 and the trigger transformer 24.

When the main capacitor 2 and the like are charged, a high level pulse signal is output from the output terminal 13*b* of the drive control circuit 13 after receiving a flash start signal, which turns on the IGBT. The known trigger circuit 22 excites the flash discharge tube 5, and at the same time the charged electricity of the step-up capacitors 31 and 32 is discharged via the IGBT and the discharge circuits 18*a* and 18*b*, which are gate means of the transistors 27 and 28. Thus the dropped voltage of the resistances 36 and 37 is applied between the bases and the emitters of the transistors 27 and 28, respectively, which turns on the transistors 27 and 28. Then a superimposed high voltage of the charged voltage of the main capacitor 2 and the step-up capacitors 31 and 32 is applied between the main electrodes of the flash discharge tube 5 via the transistors 27, 28 and the IGBT. The superimposed voltage is higher than the voltage applied in the first and the second embodiments, and is three times as high as the charged voltage of the main capacitor 2. The flash discharge tube 5 flashes by using the charged electricity of the main capacitor 2 from the time the IGBT is turned on.

Basically the same procedures are carried out as those in the first and the second embodiments hereafter: the IGBT is turned off by the drive control circuit 13 which has received the flash stop signal in the process of the luminous emission of the flash discharge tube 5, the flash discharge tube 5 stops flashing, and the step-up capacitors 31 and 32 stop discharging via the discharge circuits 18*a* and 18*b*. Thus the transistors 27 and 28 are turned off, and the step-up capacitors 31, 32 and the trigger capacitor 23 are ready to be charged.

Then the flash discharge tube 5 returns to the initial state through the ionization state, and the step-up capacitors 31 and 32 are immediately charged via the flash discharge tube 5 in the ionization state, the first diode 25, and the second diode 29, or the first diodes 25, 26, and the second diode 30. At the same time the trigger capacitor 23 is also immediately charged via the first diodes 25, 26 and the trigger transformer 24, when the bases of the transistors 27 and 28 are reverse biased by the dropped voltage of the second diodes 29 and 30, so that the transistors cannot be turned on by currents flowing through the flash discharge tube 5 in the ionization state, the first diode 25 and the like.

As a result, in the third embodiment shown in FIG. 3, in the case of repeating flashes with a high period more than several ten Hz, when the IGBT is on, a voltage three times as high as the charged voltage of the main capacitor 2, namely, the superimposed voltage of the charged voltage of the main capacitor 2 and the step-up capacitors 31 and 32 can be always applied between the main electrodes of the flash discharge tube 5. In this way, the third embodiment of the present invention can also provide the same functions and effects as those of the previous embodiments.

Figure 4:
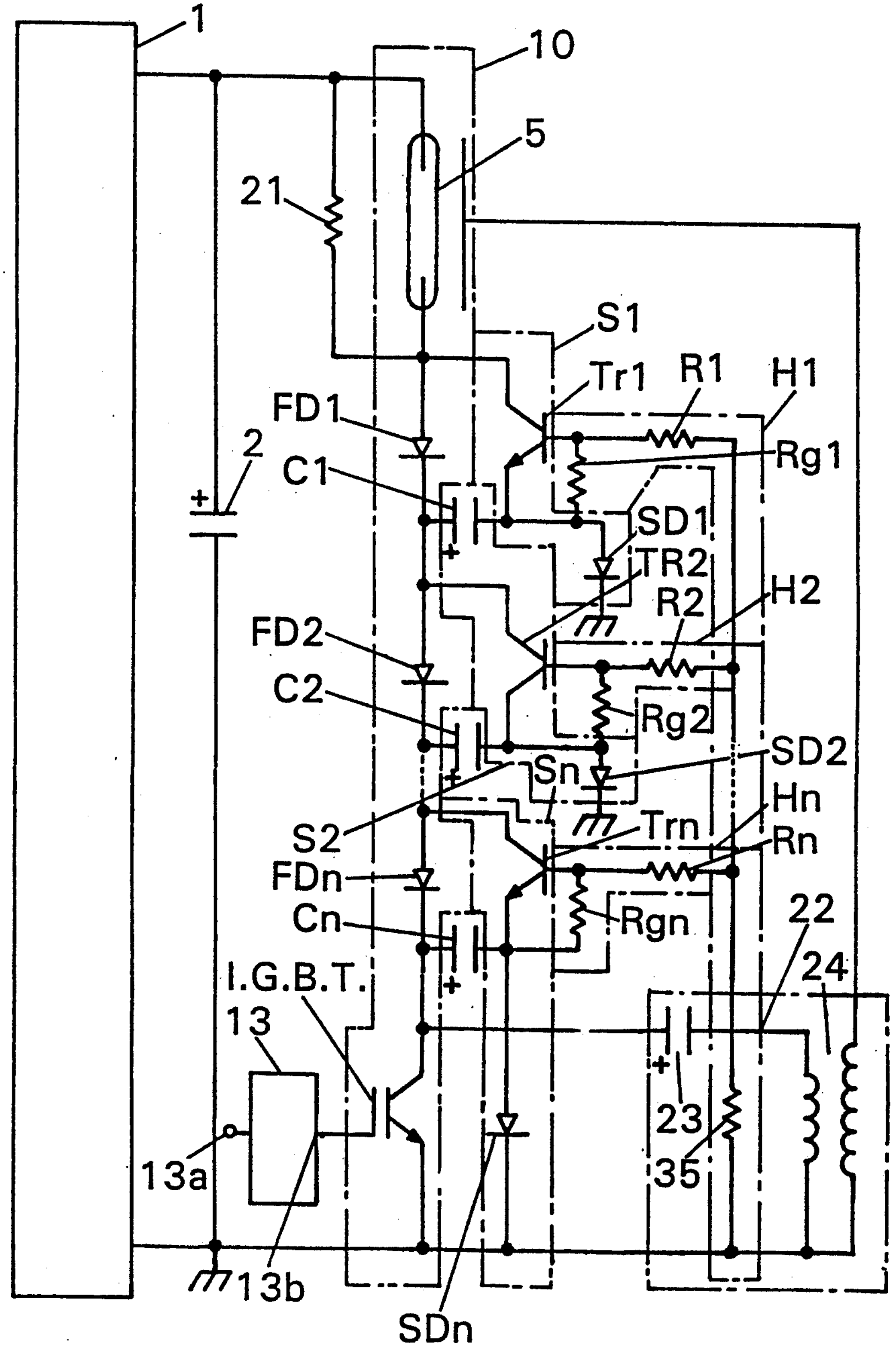
FIG. 4 is a circuit describing the fourth embodiment of a strobo device in accordance with the present invention.

FIG. 4 is a circuit of the fourth embodiment of the strobo device in accordance with the present invention.

In the forth embodiment, n pieces of first diodes FD1 to FDn forming the first series connection elements 10 with the flash discharge tube 5 and the IGBT connected between the flash discharge tube 5 and the IGBT. The n pieces of first diodes FD1 to FDn are connected to n pieces of second series connection elements S1 to Sn consisting of the transistors Tr1 to Trn and the second diodes SD1 to SDn, and is further connected to n pieces of step-up capacitors C1 to Cn, respectively. The discharge circuits H1 to Hn consisting of the resistances 35, R1 to Rn and Rg1 to Rgn and forming the discharge passages of the step-up capacitors C1 to Cn via the IGBT are connected between the bases and the emitters of the transistors Tr1 to Trn, respectively. The discharge circuits H1 to Hn work as gate means of the transistors Tr1 to Trn to turn on the transistors Tr1 to Trn with the starting voltage as the discharge circuit 18 as in the previous embodiments.

The operation of the fourth embodiment will now be described, however, the difference from the other embodiments is only in the numbers of the step-up capacitors and the like and the operation is basically the same as that of the third embodiment.

The main capacitor 2, the step-up capacitors C1 to Cn and the like are charged by the DC high voltage power supply 1. The IGBT is turned on by the drive control circuit 13 having received the flash start signal, and the transistors Tr1 to Trn are turned on by the discharge of the step-up capacitors C1 to Cn via the IGBT and the discharge circuits H1 to Hn. Then the superimposed charged voltages of the step-up capacitors C1 to Cn are superimposed again on the charged voltage of the main capacitor 2, and are applied between the main electrodes of the flash discharge tube 5.

In other words, in the fourth embodiment shown in the FIG. 4, when the IGBT is turned on, a voltage n+1 times as high as the charge voltage of the main capacitor 2 is applied between the main electrodes of the flash discharge tube 5, at which the flash discharge tube 5 flashes using the charged electricity of the main capacitor 2 by the operation of the known trigger circuit 22. When the IGBT is turned off by the drive control circuit 13 having received the flash stop signal, the discharge loops of the main capacitor 2 and the step-up capacitors C1 to Cn are cut off. The flash discharge tube 5 stops flashing and returns to the initial state through the ionization state, and the transistors Tr1 to Trn are turned off.

In the above ionization state, a current flows through the flash discharge tube 5 and the like, as in the previous embodiments, by which the step-up capacitors C1 to Cn and the trigger capacitor 23 are immediately charged.

As a result, in the fourth embodiment, in the case of repeating luminous emissions with a high period over several ten Hz, even when the IGBT is on, a voltage n+1 times as high as the charged voltage of the main capacitor 2, namely the superimposed voltage of the charged voltage of the main capacitor 2 and the step-up capacitors C1 to Cn, can always be applied between the main electrodes of the flash discharge tube 5. Thus the fourth embodiment of the present invention also provides the same functions and effects as those of the previous embodiments.

Figure 5:
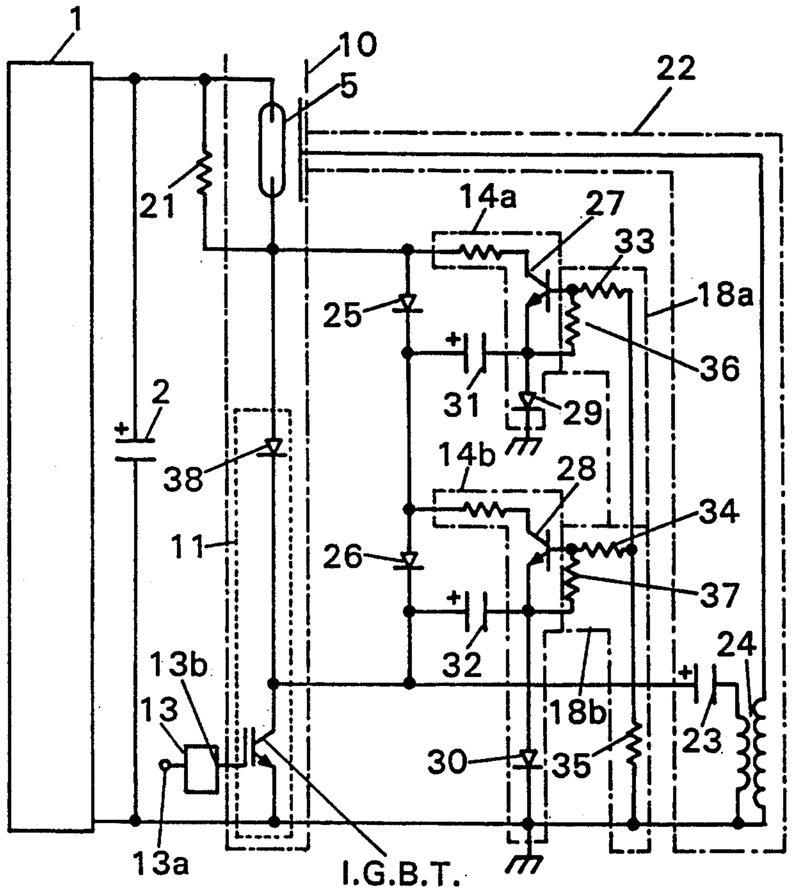
FIG. 5 is a circuit describing the fifth embodiment of a strobo device in accordance with the present invention.

FIG. 5 is a circuit showing the fifth embodiment of the strobo device in accordance with the present invention.

In the fifth embodiment, the diodes 25 and 26, which are the first diodes in the third embodiment as shown in the FIG. 3, are used as the third diodes, which do not form a discharge passage of the main capacitor 2, both ends of which are connected to the diode 38 which is used as the first diode to form the discharge passage. Therefore, the operation of the fifth embodiment is almost the same as that of the third embodiment.

In the fifth embodiment, just as in the third embodiment, when the main capacitor 2 and the step-up capacitors 31 and 32 and the like are charged forward by the DC high voltage power supply 1, the IGBT is turned on, when the transistors 27 and 28 are turned on by the discharge of the step-up capacitors 31 and 32 via the discharge circuits 18*a* and 18*b*. Then the charged voltage of the step-up capacitors 31 and 32 are applied between the main electrodes of the flash discharge tube 5, and at the same time the known trigger operation is carried out by the trigger circuit 22. Thus the flash discharge tube 5 is excited, and the superimposed voltage of the charged voltage of the main capacitor 2 and the step-up capacitors 31 and 32, which is about three times as high as the charged voltage of the main capacitor 2, is applied between the main electrodes of the flash discharge tube 5. As a result, the flash discharge tube 5 flashes using the charged electricity of the main capacitor 2. At this time, the discharge passage of the main capacitor 2 via the flash discharge tube 5 is formed via the first diode 38 as described above.

On the other hand, when the IGBT is turned off, the flash discharge tube 5 stops flashing and returns to the initial state through the ionization state, and the transistors 27 and 28 are turned off as in the third embodiment. Thus the step-up capacitors 31 and 32 and the trigger capacitor 23 are immediately charged by the current flowing through the flash discharge tube 5 and the like in the ionization state, as in the third embodiment.

As a result, in the fifth embodiment, in the case of repeating luminous emissions with a high period of more than several ten Hz, a high voltage which is about three times as high as the charged voltage of the main capacitor 2 can be applied between the main electrodes of the flash discharge tube 5. Thus the fifth embodiment also provides the same functions and effects as the other embodiments.

In addition, in the fifth embodiment, a heavy-current from the main capacitor 2 does not flow through the third diodes 25 and 26, which allows the adoption of small inexpensive diodes with a small withstand current as the third diodes 25 and 26. In other words, more diodes are used in the fifth embodiment than in the third embodiment, but the required number of a big expensive diode with a large withstand current and withstand voltage is two in the third embodiment, and only one in the fifth embodiment, which is the one used as a first diode 38. Thus the fifth embodiment has advantages in the shape and the cost of the device.

Figure 6:
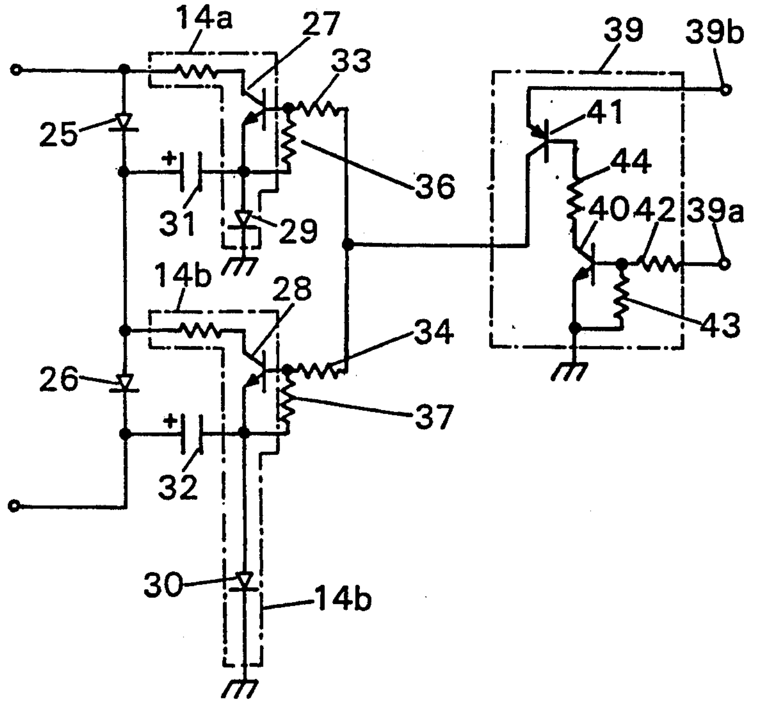
FIG. 6 is a part of a circuit describing the sixth embodiment of a strobo device in accordance with the present invention.

FIG. 6 is a part of an electric circuit showing the sixth embodiment of the strobo device in accordance with the present invention.

In the fifth embodiment the gate means is formed by the discharge circuits 18*a* and 18*b* using the discharge operation of the step-up capacitors 31 and 32. In the sixth embodiment, the gate means of the transistors 27 and 28 is formed by a gate circuit 39 which does not use the discharge operation of the step-up capacitors 31 and 32. The gate circuit 39 consists of an input terminal 39*a* receiving flash start/stop signals, a standard power supply terminal 39*b* which an appropriate standard voltage is applied to, and a first and a second transistors 40 and 41, resistances 42, 43 and 44 which form a switch circuit to supply the standard voltage to the bases of the transistors 27 and 28 in response to the flash start signals.

The operation of the sixth embodiment will be described, which is different from that of the fifth embodiment only in gate means of the transistors 27 and 28. The other operations such as stepping up between the main electrodes of the flash discharge tube 5 by the charged voltage of the step-up capacitors 31 and 32 are the same as in the fifth embodiment. When the main capacitor and the like are charged by the DC high voltage power supply (not shown), a flash start signal is received by the input terminal of the drive control circuit and the input terminal 39*a* of the gate circuit 39, and then the IGBT, the first and the second transistors 40 and 41 of the gate circuit 39 are turned on. The flash discharge tube is excited by the trigger circuit (not shown) and the appropriate standard voltage supplied to the standard power supply terminal 39*b* of the gate circuit 39 is applied to the bases of the transistors 27 and 28 via the second transistor 41. Thus, the transistors 27 and 28 are turned on, the charged voltages of the step-up capacitors 31 and 32 are applies between the main electrodes of the flash discharge tube 5 as in the fifth embodiment. In this way the flash discharge tube 5 starts the luminous operation and flashes using the charged electricity of the main capacitor 2.

When the flash stop signal is received by the input terminal of the drive control circuit (not shown) and the input terminal 39*a* of the gate circuit 39, the IGBT is turned off, as in the previous embodiments, which also turns off the first transistor 40 at the same time. Then the appropriate standard voltage via the second transistor 41 stops being applied to the bases of the transistors 27 and 28, resulting in turning off the transistors 27 and 28. As a result, the step-up capacitors 31 and 32 are ready to be charged.

Then the flash discharge tube 5 stops flashing by turning off the IGBT, when the step-up capacitors 31 and 32 and the like are immediately charged by the current flowing through the flash discharge tube 5 in the ionization state. The next luminous emission is prepared in the same way as in the fifth embodiment, which will not be described here. In this way, the sixth embodiment also provides the same functions and effects as in the fifth embodiment.

The gate circuit 39 in the sixth embodiment shown in FIG. 6 can be utilized in all the previous embodiments.

Figure 12:
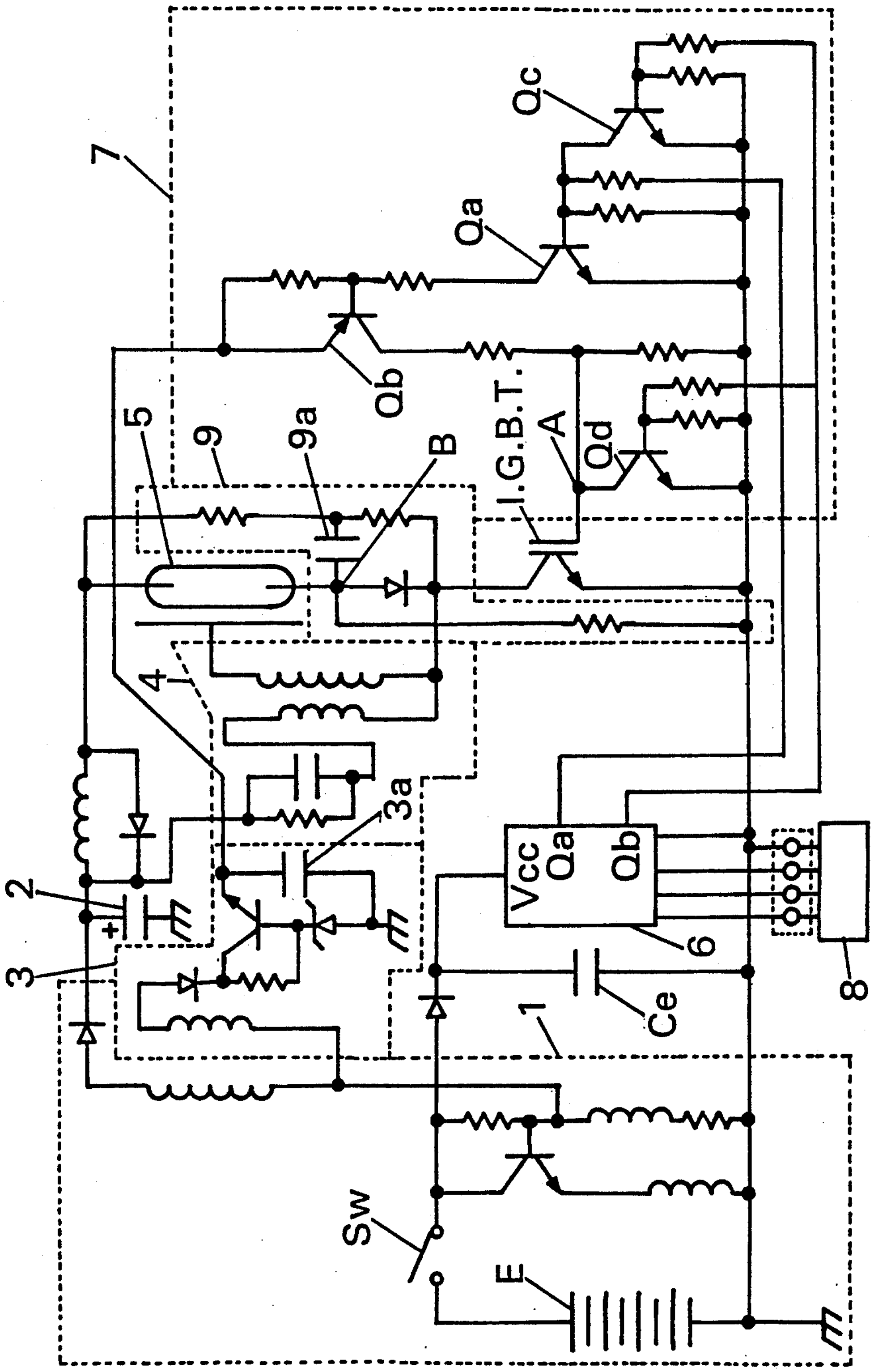
FIG. 12 PRIOR ART
FIG. 12 is a circuit describing an embodiment of a strobo device disclosed in U.S. Pat. No. 4,839,686.
Figure 13A:
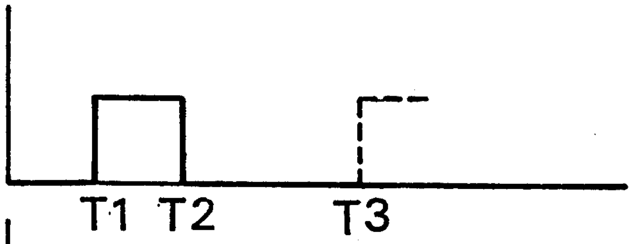
FIGS. 13*a*, 13*b* and 13*c* are diagrams showing voltage waveforms and flash waveforms at predetermined points in accordance with the device of FIG. 12.
Figure 13B:
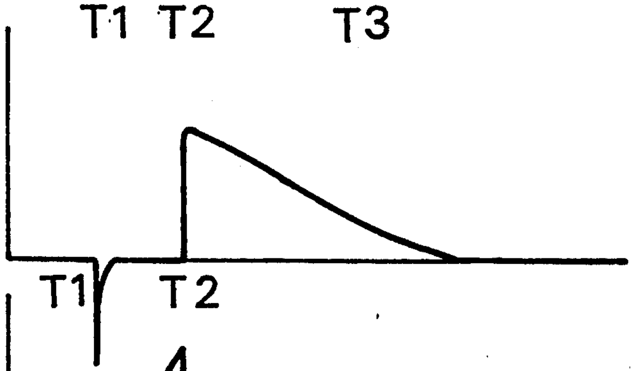
Figure 13C:
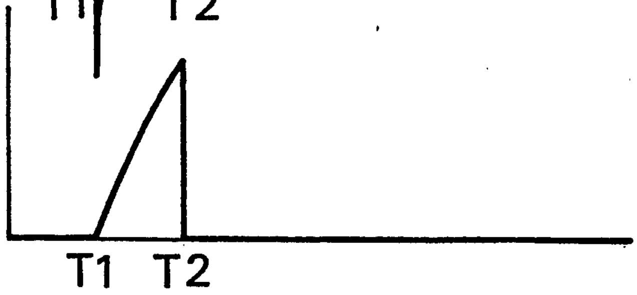
Figure 2:
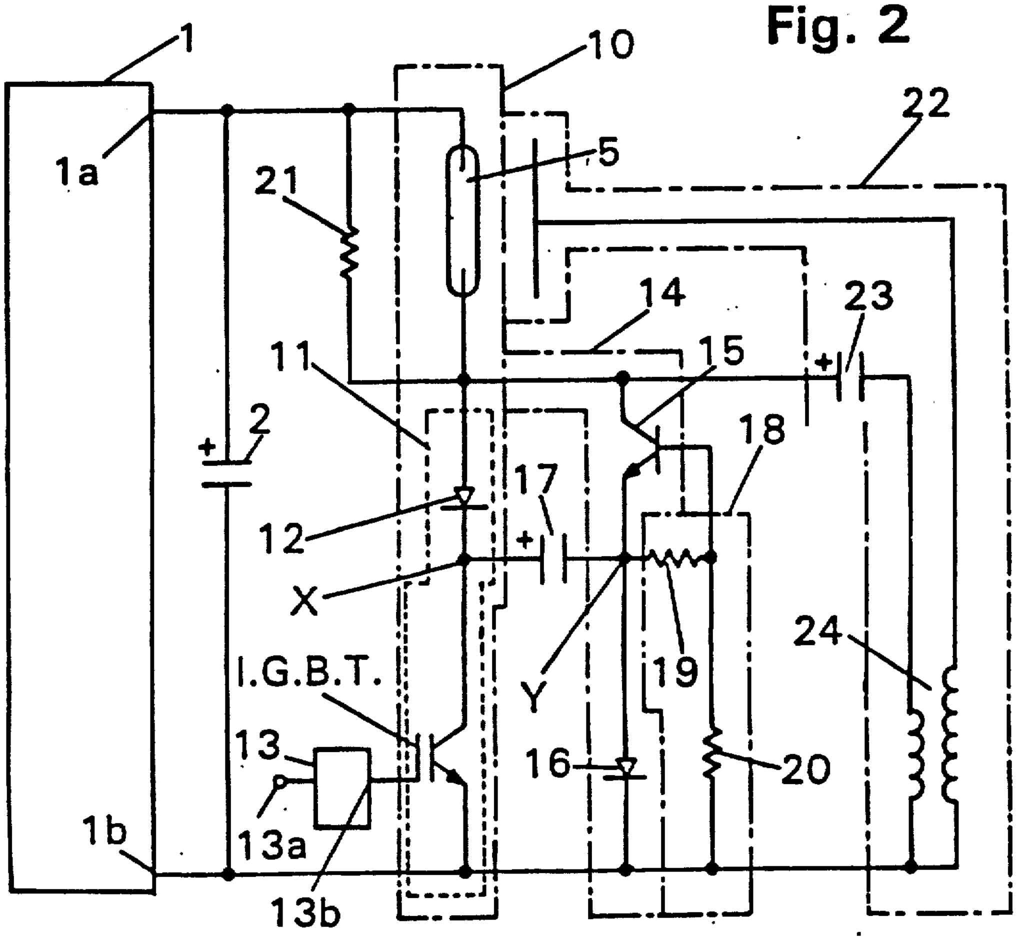
Figure 3:
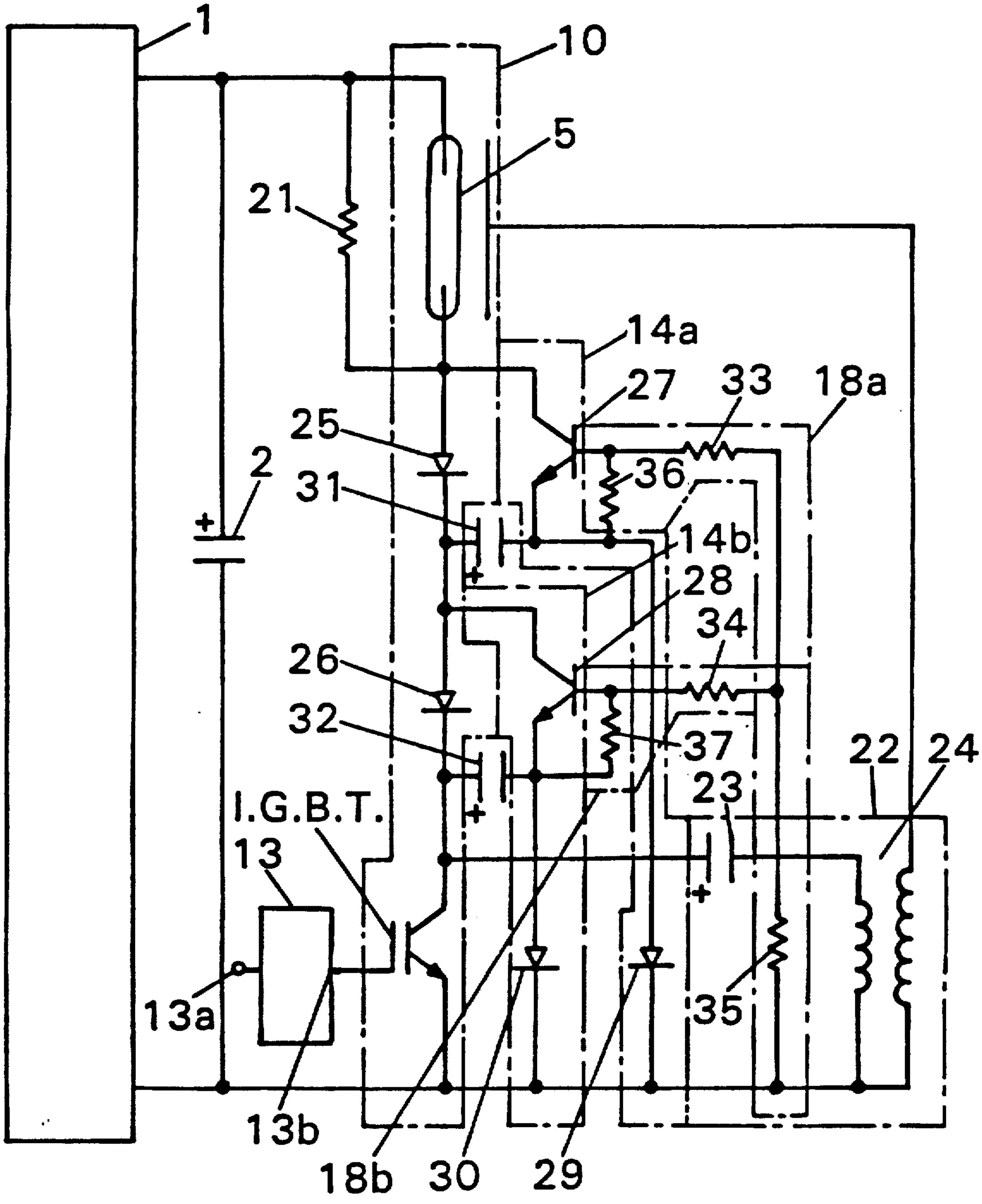
Figure 4:
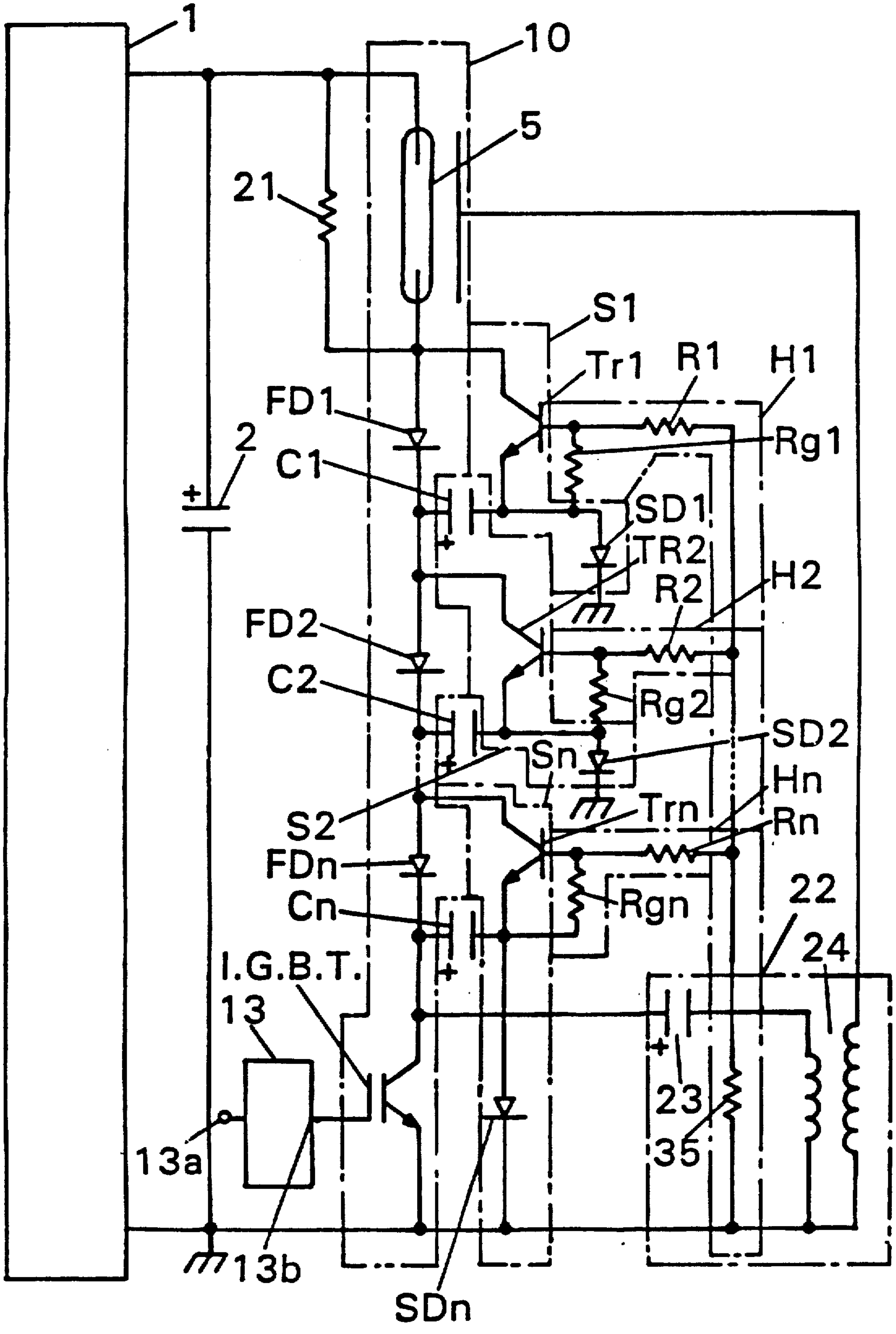
Figure 10:
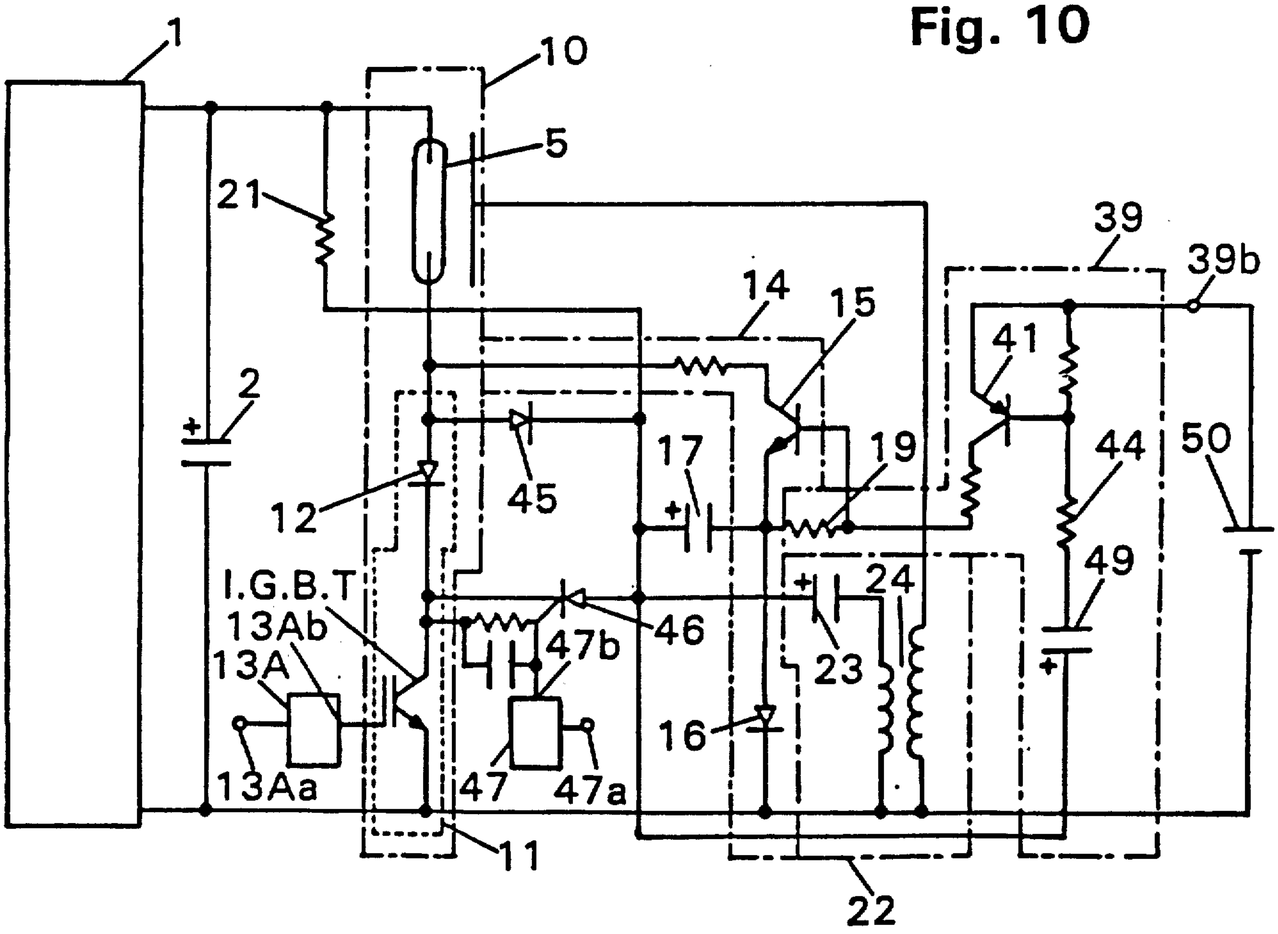
Figure 11:
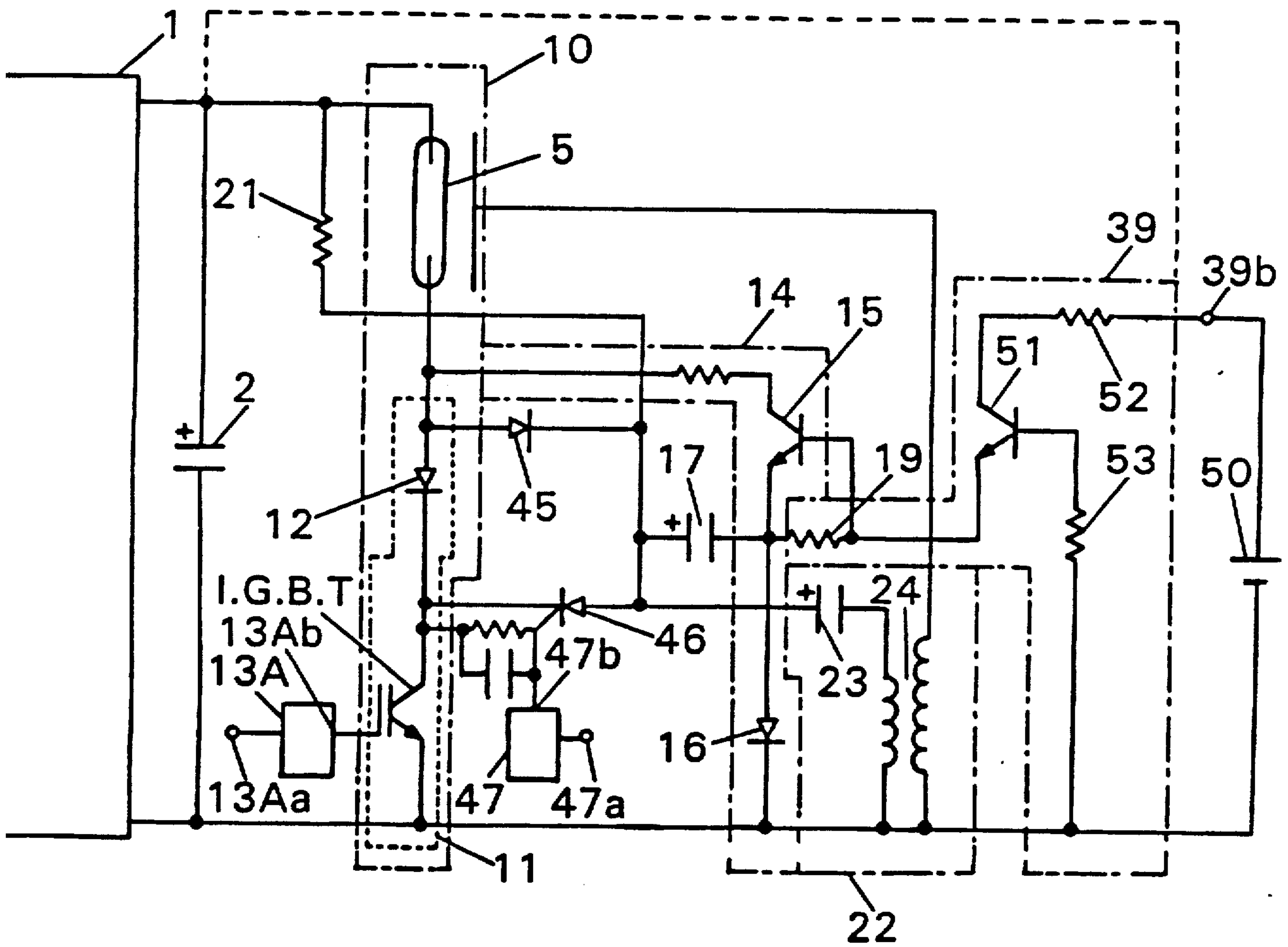
Figure 12:
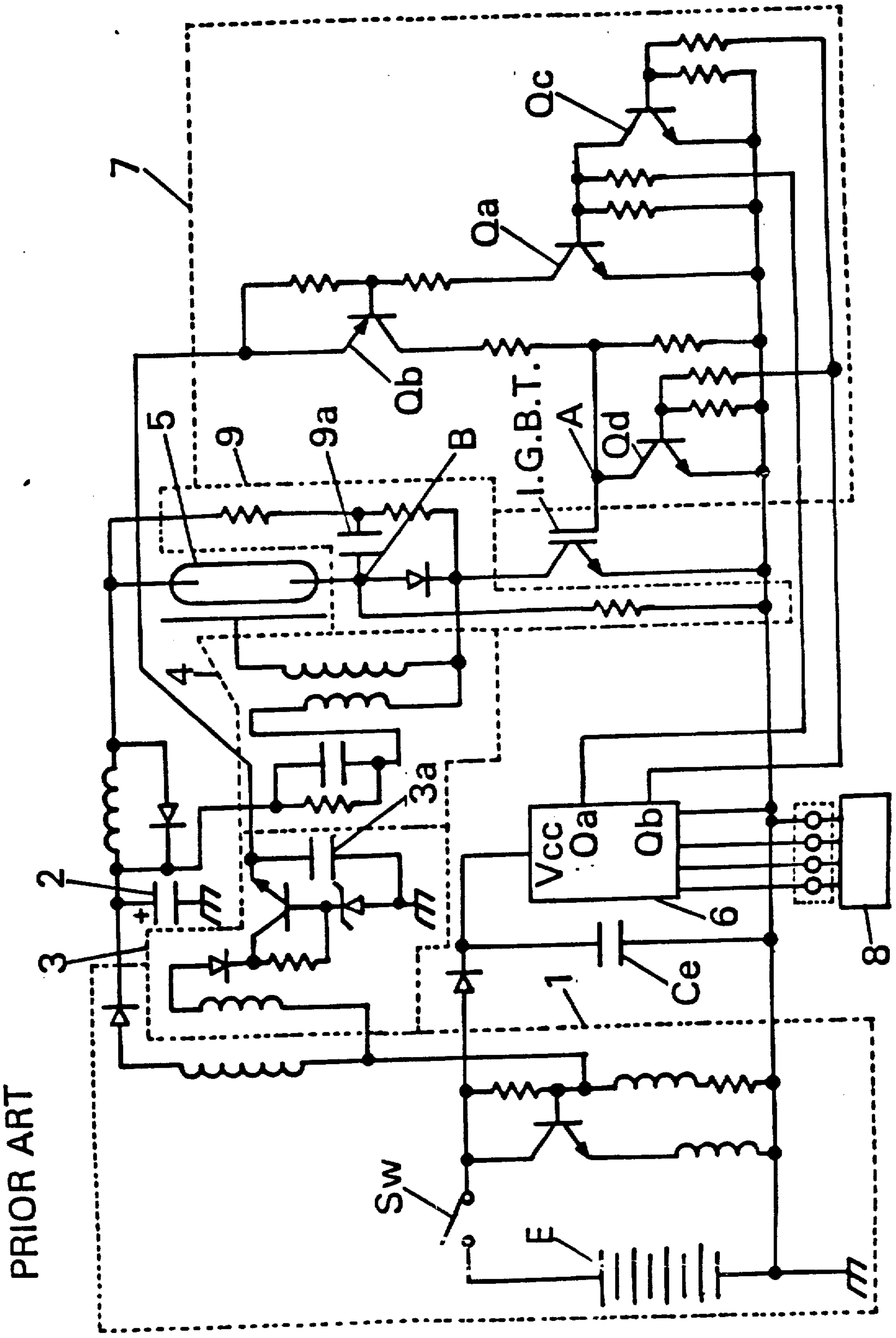
FIG. 12 PRIOR ART

In the above description of the six embodiments of the strobo device in accordance with the present invention, the drive control circuit 13 has a system to turn on the IGBT in response to the flash start signal and to turn off the IGBT in response to the flash stop signal, that is, a system to turn on the IGBT only in the luminous operation, as in the conventional embodiment shown in FIG. 12. Another system can be used, for example, a system to turn on the IGBT in response to the operation of the DC high voltage power supply 1 and to turn off the IGBT in response to the flash stop signal, that is, a system to turn on the IGBT while the strobo device is being used.

Figure 7:
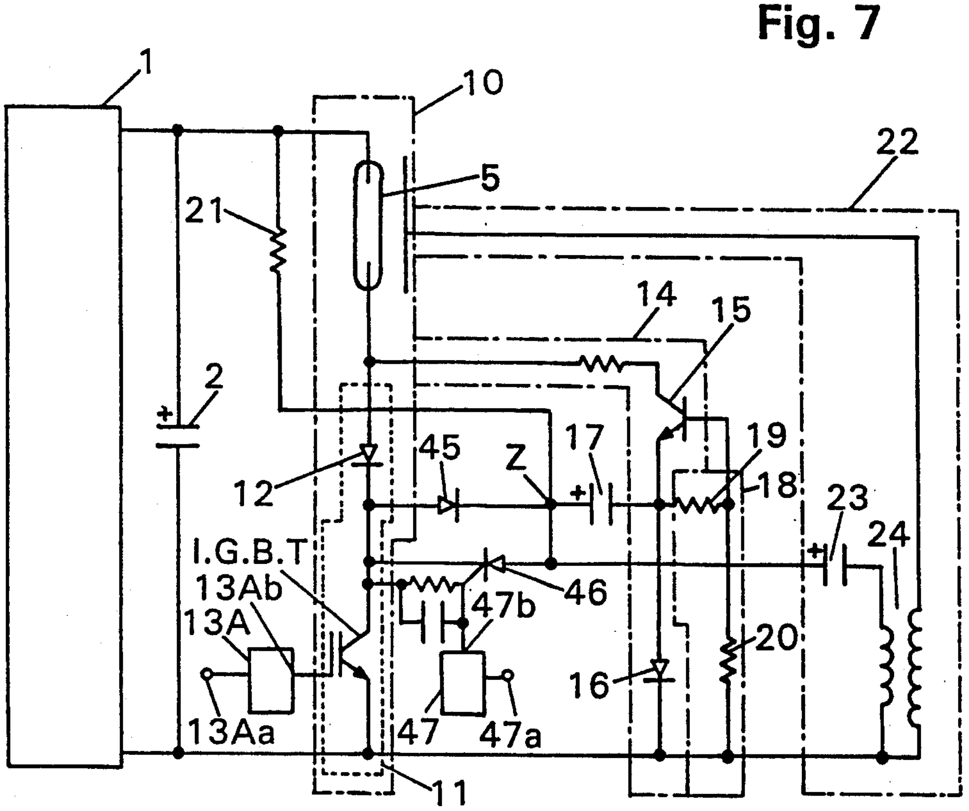
FIG. 7 is a circuit describing the seventh embodiment of a strobo device in accordance with the present invention.

FIG. 7 is a circuit showing the seventh embodiment of the strobo device in accordance with the present invention provided with a drive control circuit 13A of the latter system in view of the above alternative.

In the drive control circuit 13A of the seventh embodiment, an operation signal is supplied to an input terminal 13A*a* by the DC high voltage power supply 1, and the IGBT is turned on. The IGBT is turned off by supplying the flash stop signal. The duration of the IGBT being off is appropriately determined in view of the desired luminous condition, such as whether or not the luminous emission is repeated at a high speed, by controlling the duration of inputting the flash stop signals or the time of supplying the operation signals.

One end of the step-up capacitor 17 is connected to the cathode of the first diode 12 via the parallel elements consisting of a backflow prevent diode 45 and an SCR 46, a second control switch element having a control polarity, which are reverse parallel connected to each other as shown in FIG. 7. A gate, a control polarity of the SCR 46, forms a switch control means with the drive control circuit 13A, and is connected to an output terminal 47*b* of an operation control circuit 47 working in response to the flash start/stop signal received by an input terminal 47*a*. The operation control circuit 47 outputs an on voltage to turn on the SCR 46 from the output terminal 47*b* by receiving the flash starting signal by the input terminal 47*a*, and stops outputting the on voltage by receiving the flash stop signal by the input terminal 47*a*. One end of the charge resistance 21 is connected to a connection Z among the backflow prevent diode 45, the step-up capacitor 17 and the SCR 46. One end of the trigger capacitor 23 of the trigger circuit 22 is also connected to the connection Z.

The operation of the seventh embodiment will now be described. By starting the DC high voltage power supply 1 the main capacitor 2 is charged forward as in the first embodiment. The drive control circuit 13A is in the operation state in response to the start of the DC high voltage power supply 1, and the on voltage of the IGBT is output from an output terminal 13A*b*, at which the IGBT is ready to conduct. At the same time, the step-up capacitor 17 and the trigger capacitor 23 are charged forward via the charge resistance 21 and the second diode 16 or the charge resistance 21 and the trigger transformer 24. At an appropriate time after the main capacitor 2 is charged, when the flash start signal is supplied to the input terminal 47*a* of the operation control circuit 47, the operation control circuit 47 is actuated and outputs the on voltage of the SCR 46 from the output terminal 47*b*. The on voltage is supplied to the gate of the SCR 46. At this time the IGBT is ready to conduct, thus, the SCR 46 is turned on at the time of receiving the on voltage.

Then the condition of the circuit shown in FIG. 7 is in the same condition as that of the circuit when the IGBT is on in the first embodiment. Thus the charged electricity of the step-up capacitor 17 is discharged via the discharge circuit 18, thereby turning the transistor 15 on. At the same time the charged electricity of the trigger capacitor 23 is discharged via the trigger transformer 24 and the like, resulting in carrying out the known trigger operation. Then the charged voltage of the step-up capacitor 17 superimposed on the charged voltage of the main capacitor 2 is applied between the main electrodes of the flash discharge tube 5, which is excited by the trigger circuit 22. In this way the flash discharge tube 5 starts flashing using the charged electricity of the main capacitor 2 from the time of turning of the SCR 46.

On the other hand, when the flash stop signal is received by the input terminals 13A*a* and 47*a* of the drive control circuit 13A and the operation control circuit 47, respectively, IGBT is turned off and the on voltage stops being supplied to the gate of the SCR 46. Thus the flash discharge tube 5 stops flashing and returns to the initial state through the ionization state.

At the same time, the discharge loops of the step-up capacitor 17 and the trigger capacitor 23 are cut off, resulting in turning off the SCR 46, and the both capacitors are ready to be charged. In the ionization state of the flash discharge tube 5 currents flow through a loop of the main capacitor 2, the first diode 12, the backflow prevent diode 45, the step-up capacitor 17 and the second diode and a loop of the main capacitor 2, the first diode 12, the backflow prevent diode 45, the trigger capacitor 23 and the trigger transformer 24. Thus the step-up capacitor 17 and the trigger capacitor 23 are immediately charged as in the previous embodiments. In this way the seventh embodiment also provides such functions and effects as preventing flash failures in the repeating luminous emissions at a high speed, as in the previous embodiments.

Figure 8:
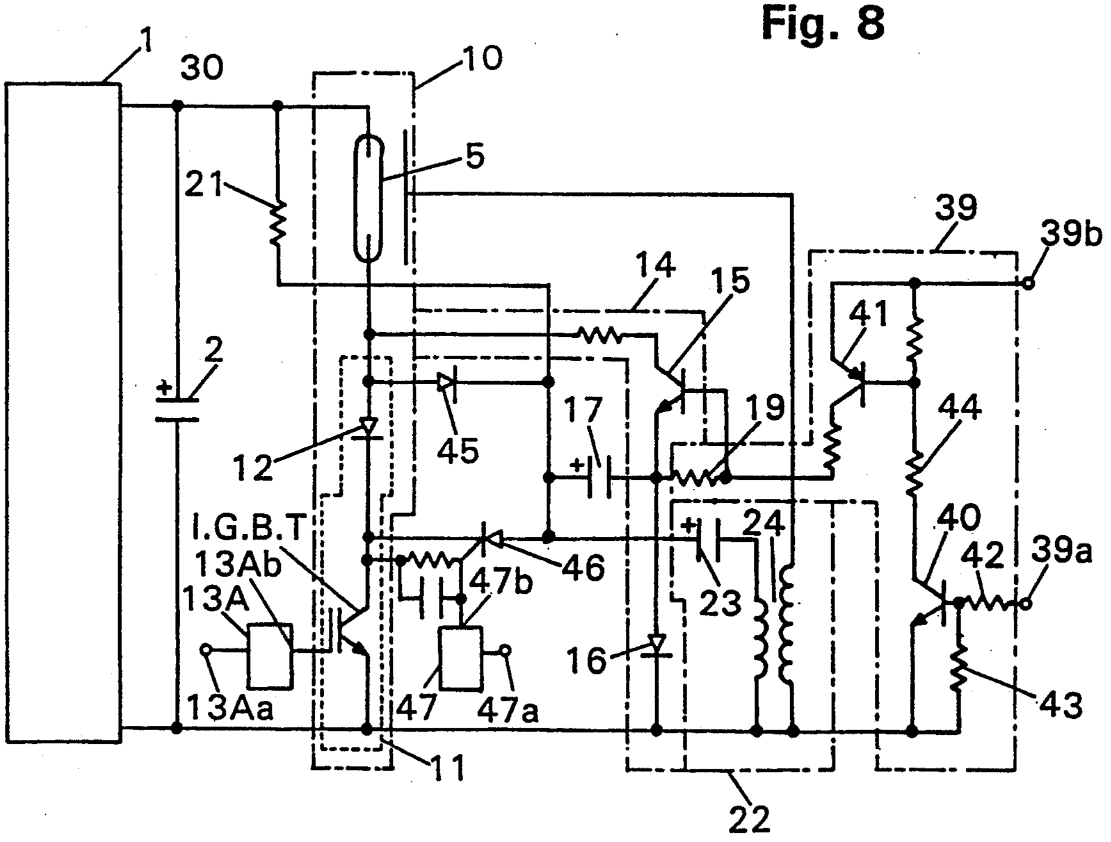
FIG. 8 is a circuit describing the eighth embodiment of a strobo device in accordance with the present invention.

FIG. 8 is a circuit showing the eighth embodiment of the strobo device in accordance with the present invention. This embodiment is also provided with the drive control circuit 13A with the system to turn on the IGBT by the DC high voltage power supply 1.

As shown in FIG. 8, the connecting point of the anode of the backflow prevent diode 45 in FIG. 7 is changed from the cathode of the first diode 12 to the anode of the same. The gate circuit 39 described in the sixth embodiment is connected to the base as a gate means of the transistor 15, the control switch element.

The operation of the eighth embodiment will now be described. The main capacitor 2, the step-up capacitor 17 and the trigger capacitor 23 are charged forward by the DC high voltage power supply 1 as in the previous embodiments. At the same time, as in the seventh embodiment, the IGBT is ready to conduct by the drive circuit 13A working in response to the start of the DC high voltage power supply 1. Then the flash start signal is supplied to the input terminal 47*a* of the operation control circuit 47, and the operation control circuit 47 outputs the on voltage of the SCR 46 and turns the SCR 46 on.

The flash start signal is also supplied to the input terminal 39*a* of the gate circuit 39 and the voltage transistor 40 is turned on. Thus the standard voltage supplied to the standard power supply terminal 39*b* of the gate circuit 39 is applied to the base of the transistor 15, and turns on the transistor 15. The charged electricity of the trigger capacitor 23 is discharged by turning on the SCR 46, then the flash discharge tube 5 is excited. At this time, the vibrating voltage caused by the above discharge is excited at the primary winding of the trigger transformer 24.

In this eighth embodiment, the backflow prevent diode 45 is connected between the cathode of the flash discharge tube 5 and one end of the step-up capacitor 17. Therefore, a part of the above vibrating voltage is applied between the main electrodes of the flash discharge tube 5 via the main capacitor 2, the flowback prevent diode 45 and the trigger capacitor 23. Furthermore, by turning on the transistor 15, the charged voltage of the step-up capacitor 17 is applied between the main electrodes of the flash discharge tube 5 via the SCR 46, the IGBT and the main capacitor 2 as in the seventh embodiment. In this way in the eighth embodiment, a part of the vibrating voltage and the charged voltage of the step-up capacitor 17 as well as the charged voltage of the main capacitor 2 is applied between the main electrodes of the flash discharge tube 5. Thus the flash discharge tube 5 starts flashing from the time the SCR 46 is turned on using the charged electricity of the main capacitor 2.

On the other hand, when the flash stop signal is supplied to the input terminals 13A*a*, 47*a* and 39*a* of the drive control circuit 13A, the operation control circuit 47 and the gate circuit 39, respectively, the IGBT is turned off, as in the sixth and the seventh embodiments, and the on voltage stops being supplied to the SCR 46. Thus, the flash discharge tube 5 stops flashing and returns to the initial state through the ionization state. At the same time, the SCR 46 and the transistors 15 are turned off, and the step-up capacitor 17 and the trigger capacitor 23 are ready to be charged. Then the step-up capacitor 17 and the trigger capacitor 23 are immediately charged via the main capacitor 2 and the flowback prevent diode 45 in the ionization state of the flash discharge tube 5. Thus the eighth embodiment also provides the same functions and effects as in the other embodiments.

The discharge circuit 18 in the seventh embodiment can be used instead of the gate circuit 39 in the eighth embodiment. The gate circuit 39 in the eighth embodiment can be used instead of the discharge circuit 18 in the seventh embodiment as well.

Figure 9:
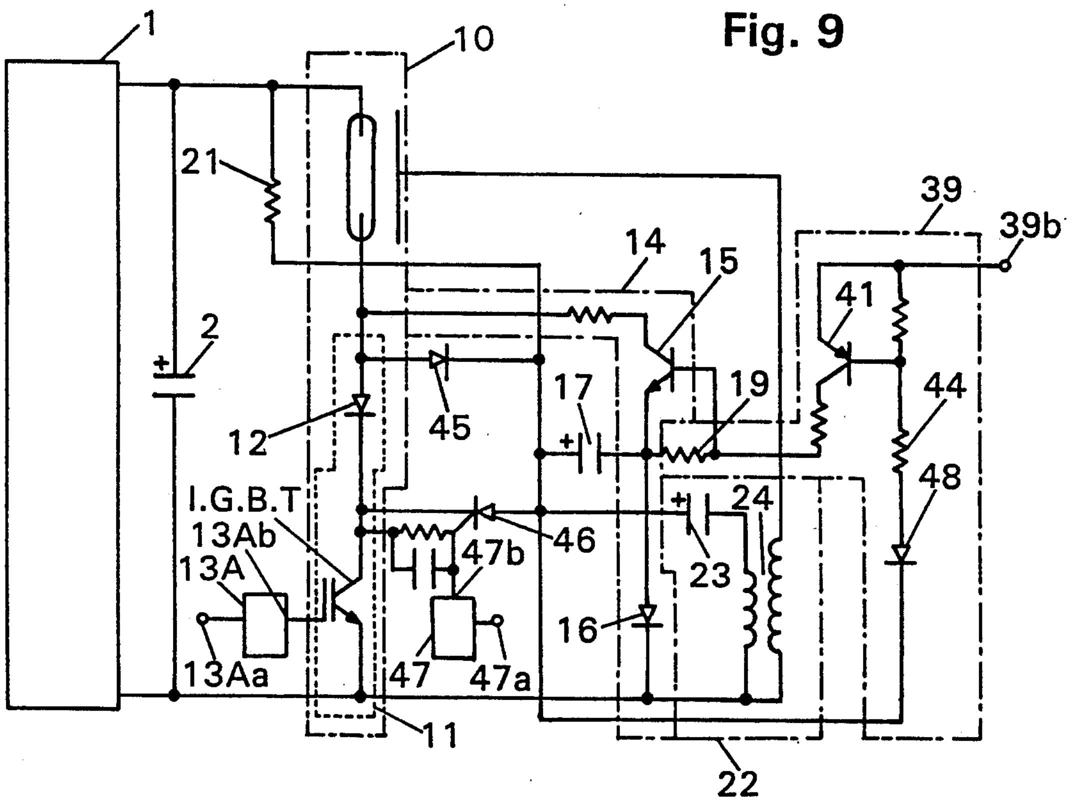
FIG. 9 is a circuit describing the ninth embodiment of a strobo device in accordance with the present invention.

FIG. 9 is a circuit of the strobo device in accordance with the present invention. In the ninth embodiment, the diode 48, whose cathode is connected to the anode of the SCR 46, is adopted instead of the first transistor 40 in the gate circuit 39 described in the eighth embodiment.

The operation of the ninth embodiment will now be described. The difference from the eighth embodiment is using the diode 48 instead of the transistor 40, and other operations are the same as in the eighth embodiment.

When the main capacitor 2, the step-up capacitor 17 and the like are charged by the DC high voltage power supply 1, the SCR 46 is turned on by the operation control circuit 47 receiving the flash start signal as in the eighth embodiment. At this time, the IGBT is ready to conduct. Then the anode of the SCR 46 is given a low potential because the IGBT is ready to conduct by the operation of the drive control circuit 13A, and the trigger circuit 22 works as in the eighth embodiment. Then the flash discharge tube 5 is excited, and a part of the vibrating voltage induced by the trigger transformer 24 is applied between the main electrodes of the flash discharge tube 5. At the same time, the base of the transistor 41 connected to the anode of the SCR 46 via the diode 48 is given a low potential, thus the transistor 41 is turned on.

The standard voltage supplied to the standard power supply terminal 39*b* is applied to the base of the transistor 15 via the transistor 41, resulting in turning on the transistor 15. Then the charged voltage of the step-up capacitor 17 is applied between the main electrodes of the flash discharge tube 5 via the SCR 46 and the like as in the eighth embodiment. As described above, a part of the vibrating voltage and the charged voltage of the step-up capacitor 17 as well as the charged voltage of the main capacitor 2 is applied between the main electrodes of the flash discharge tube 5 also in the ninth embodiment. Thus the flash discharge tube 5 starts the flashing from the time the SCR 46 is turned on by using the charged electricity of the main capacitor 2.

The charging operation of the step-up capacitor 17 and the like after the IGBT is turned off by the drive control circuit 13A having received the flash stop signal is the same as in the eighth embodiment, which will not be described here.

Thus the ninth embodiment can provide the same functions and effects as in the other embodiments.

The gate circuit 39 in the ninth embodiment can be used instead of the discharge circuit 18 in the seventh embodiment or the gate circuit 39 in the eighth embodiment.

Figure 10:
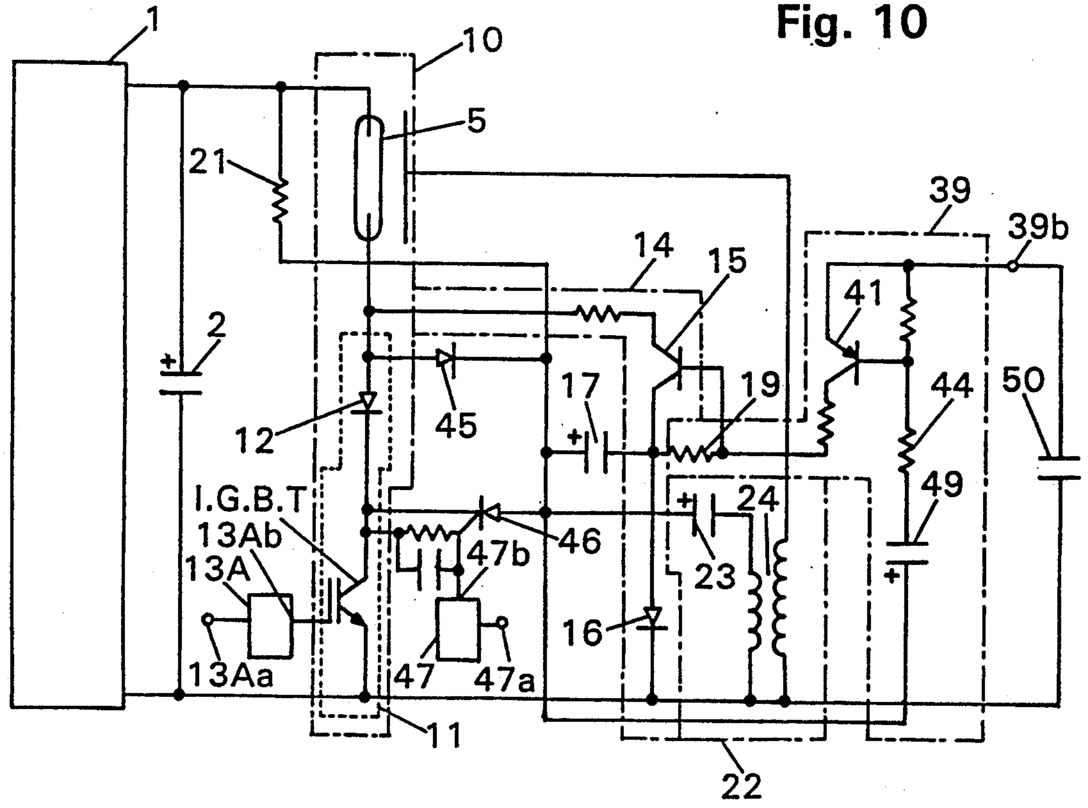
FIG. 10 is a circuit describing the tenth embodiment of a strobo device in accordance with the present invention.

FIG. 10 is a circuit showing the tenth embodiment of the strobo device in accordance with the present invention.

In the tenth embodiment, the capacitor 49 is adopted instead of the diode 48 of the gate circuit 39 as in the ninth embodiment. In the case, the standard power supply terminal 39b which the appropriate standard voltage is applied to, is connected to one end of a standard power supply 50 outputting the standard power, the other end of which is connected to the terminal with a lower potential of the main capacitor 2.

The operation of the tenth embodiment will now be described. The difference from the ninth embodiment is that the diode 48 is replaced with the capacitor 49 and the standard power supply 50 is formed. Other operations are the same as the previous eighth and ninth embodiments.

By starting the DC high voltage power supply 1, the main capacitor 2, the step-up capacitor 17 and the like are charged. In addition, the capacitor 49 of the gate circuit 39 is charged forward via the charge resistance 21, the resistance 44 and the standard power supply 50. Then the flash start signal is supplied to the operation control circuit 47, turning on the SCR 46 as in the previous embodiments. At this time, the IGBT is ready to conduct by the drive control circuit 13A as in the seventh embodiment.

When the SCR 46 is turned on, the anode is given a low potential, thus the trigger circuit 22 works as in the eighth and ninth embodiments. The flash discharge tube 5 is excited, and a part of the vibrating voltage induced by the trigger transformer 24 is applied between the main electrodes of the flash discharge tube 5. At the same time, the charged electricity of the capacitor 49 is discharged via the SCR 46, thus the charged voltage of the capacitor 49 and the standard voltage output by the standard power supply 50 are applied between the emitter and the base of the transistor 41, resulting in turning the transistor 41 on.

The standard voltage output by the standard power supply 50 connected to the standard power supply terminal 39b is applied to the base of the transistor 15 via the transistor 41, resulting in turning on the transistor 15. Then the charged voltage of the step-up capacitor 17 is applied between the main electrodes of the flash discharge tube 5 via the SCR 46 and the like.

In the tenth embodiment, a part of the vibrating voltage and the charged voltage of the step-up capacitor 17 as well as the charged voltage of the main capacitor 2 are also applied between the main electrodes of the flash discharge tube 5, as in the eighth and ninth embodiments. Thus the flash discharge tube 5 starts flashing from the time the SCR 46 is turned on by using the charged electricity of the main capacitor 2.

When the IGBT is turned off by the drive control circuit 13A having received the flash stop signal, the step-up capacitor 17 and the trigger capacitor 23 are immediately charged, and the capacitor 49 of the gate circuit 39 is also rapidly charged, and the next luminous emission is prepared. Thus the tenth embodiment also provides the same functions and effects as the other embodiments.

In the ninth embodiment, it is necessary to use a diode with a high withstand voltage as the diode 48 because its cathode is connected to the terminal on the high potential side of the step-up capacitor 17. However, in the tenth embodiment, the above is not necessary because the capacitor 49 is used, resulting in making the structure of the device inexpensive.

The discharge circuit 18 in the seventh embodiment or the gate circuit 39 in the eighth embodiment can be used instead of the gate circuit 39 in the tenth embodiment.

Figure 11:
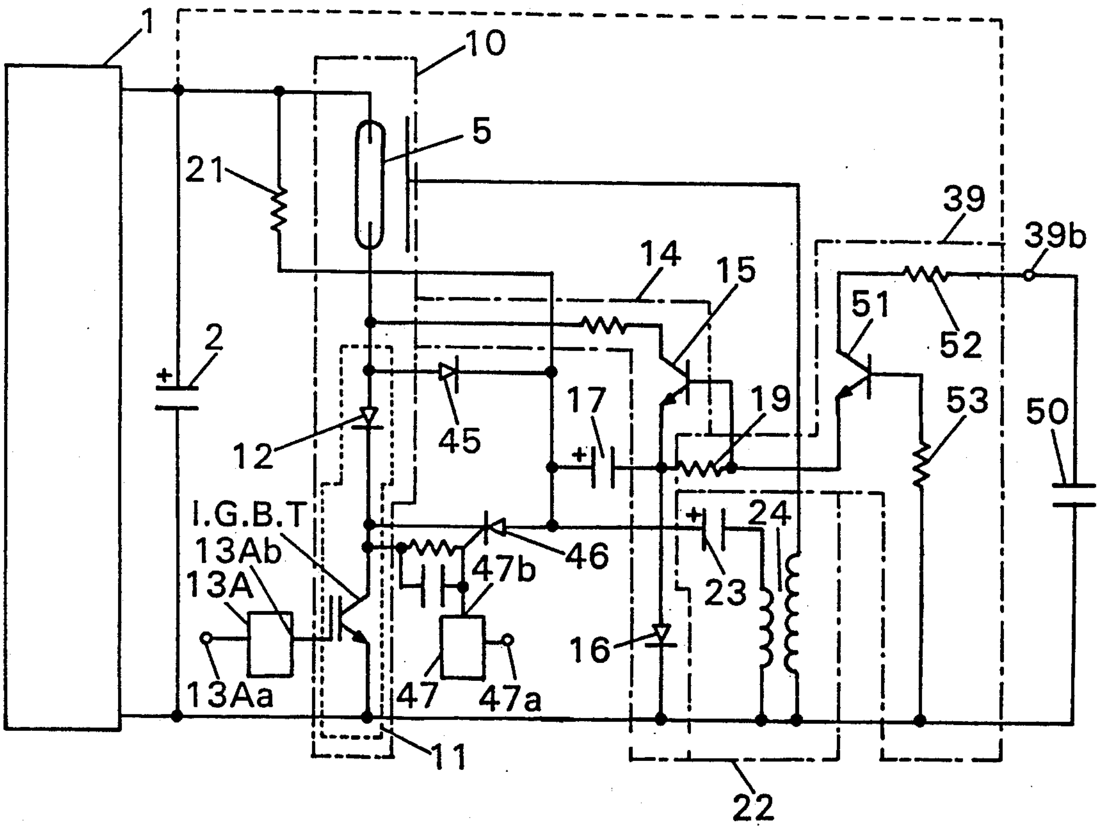
FIG. 11 is a circuit describing the eleventh embodiment of a strobo device in accordance with the present invention.

FIG. 11 is a circuit showing the eleventh embodiment of the strobo device in accordance with the present invention. In the eleventh embodiment, the pnp-type transistor 41 of the gate circuit 39 in the tenth embodiment is replaced with a npn-type transistor 51. The resistances without a reference numeral connected between the emitter and the base of the transistor 41 and the resistance without a reference numeral connected to the collector of the transistor 41 in the tenth embodiment are eliminated in the eleventh embodiment. Additionally, a resistance 52 is connected between a collector of the npn-type transistor 51 and the standard power supply terminal 39b to which an appropriate standard voltage is applied. Furthermore, a resistance 53 is connected between a base of the npn-type transistor 51 and the terminal with a low potential of the main capacitor 2. The standard power supply terminal 39b is connected to a terminal with a high potential of a standard power supply 50 outputting an appropriate standard voltage as in the tenth embodiment.

As shown in FIG. 11 with a broken line, the power supply terminal 39b may be connected to the terminal with a high potential of the main capacitor 2 instead of the standard power supply 50. Namely, the voltage which should be supplied to the power supply terminal 39b should basically saturate the transistor 15 completely, therefore, the above structure can be obtained by utilizing, for example, the transistor 51 with a high withstand. It goes without saying that the above structure in which the main capacitor 2 is used instead of the standard power supply can be applied to the sixth or the eighth embodiments among the previous embodiments in which the gate circuit 39 is disclosed.

The operations of the eleventh embodiment shown in FIG. 11 will now be described. The difference from the ninth embodiment is that a drive current supply system to the base of the transistor 15, such as a change of the polarity of the transistor, and the other operations are the same as those of the eighth embodiment.

The main capacitor 2, the step-up capacitor 17 and the like are charged forward by the DC high voltage power supply 1 as in the previous embodiments. Then a flash start signal is supplied to the operation control circuit 47, and the SCR 46 is turned on as in the seventh to ninth embodiments. At this time the IGBT is ready to conduct by the drive control circuit 13A as in the seventh embodiment. When the SCR 46 is turned on, the anode thereof has a low potential, which actuates the trigger circuit 22, as in the eighth to tenth embodiments. Then the flash discharge tube 5 is excited and a part of the vibrating voltage induced by the trigger transformer 24 is applied between the main electrodes of the flash discharge tube 5.

At the same time, the charged electricity of the step-up capacitor 17 is discharged via the SCR 46, the IGBT, the resistance 53 and the resistance 19, allowing a base current of the npn-type transistor 51 to flow, resulting in turning on the npn-type transistor 51. Then the standard voltage output by the standard power supply 50 connected to the standard power supply terminal 39b is applied to the base of the transistor 15 via the transistor 51, turning the transistor 15 on. The charged voltage of the step-up capacitor 17 is applied between the main electrodes of the flash discharge tube 5 via the SCR 46. As in the eighth to tenth embodiments, also in the eleventh embodiment, the charged voltage of the main capacitor 2 as well as a part of the vibrating voltage and the charged voltage of the step-up capacitor 17 are applied between the main electrodes of the flash discharge tube 5. Thus the flash discharge tube 5 starts the luminous operation from the time the SCR 46 is turned on, and flashes by using the charged electricity of the main capacitor 2.

When the IGBT is turned off by the drive control circuit 13A having received a flash stop signal, the step-up capacitor 17 and the trigger capacitor 23 are immediately charged, and the next luminous operation is prepared, as in the eighth to tenth embodiments. Therefore, the eleventh embodiment can provide the same functions and effects as other embodiments.

In the first and second embodiments, the discharge circuit 18 in which the charged electricity of the step-up capacitor 17 is used, as in the eleventh embodiment, to supply a base current of the transistor 15, that is, the first control switch element is provided. However, in the eleventh embodiment the step-up operation between the main electrodes of the flash discharge tube 5 is advantageously carried out.

In case of the discharge circuit 18 and the like in the previous embodiments, it is necessary to supply a current of several mA order to the base of the first control switch element, for example, the transistor 15 via the resistance 20 from the step-up capacitor 17 in order to completely saturate the transistor 15. Such expenditure of energy reduces the quantity of energy which can be supplied to the flash discharge tube 5 from the step-up capacitor 17 when the first switch element is turned on.

On the contrary, in the eleventh embodiment, the charged energy of the step-up capacitor 17 is not used to supply a base current to the transistor 15, the first control switch element. Namely, the eleventh embodiment has a structure in which the base current is supplied to the transistor 15 by the standard power supply 50, not by the step-up capacitor 17.

A part of the charged energy of the step-up capacitor 17 is used to completely saturate the npn-type transistor 51 controlling the time of the base current supply from the standard power supply 50. The required quantity of the current to supply to the base of the npn-type transistor 51 in order to saturate the npn-type transistor 51 is only a micro current of several hundred $\mu$A order, which matters little for the application of the charged voltage of the step-up capacitor to the flash discharge tube 5. Therefore, in the eleventh embodiment, the charged energy of the step-up capacitor 17 is more effectively applied between the main electrodes of the flash discharge tube 5 than in the first embodiment and the like. As a result, when the charged voltage of the main capacitor 2 is reduced, the flash discharge tube 5 can flash with lower charged voltage than in the first embodiment and the like.

In the eleventh embodiment, as shown in FIG. 11 and the above described structure, fewer elements are used than in the sixth, ninth and tenth embodiments. In these embodiments an appropriate standard voltage is also used as a drive source of the first control switch element, for example, the transistor 15.

The gate circuit 39 in the eleventh embodiment can be used instead of the discharge circuit 18 or the gate circuit 39 as in the first to ninth embodiments.

In the embodiments described in FIGS. 7 to 11, the device is provided with the drive control circuit 13A which turns on the IGBT in response to the operation of the DC high voltage power supply 1. However, the drive control circuit 13 which turns on the IGBT only when the flash discharge tube 5 is flashing as described in the first embodiment can be used in these embodiments shown in FIGS. 7 to 11.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalent thereof by those skilled in the art to which this invention pertains.

What is claimed is:

1. A strobo device, comprising a DC high voltage power supply, a main capacitor which is connected to both ends of the DC high voltage power supply, first series connection elements having a flash discharge tube, a first diode and an insulated gate bipolar transistor connected in series, connected to both ends of the main capacitor and forming a discharge passage of the main capacitor via the flash discharge tube, second series connection elements having a control switch element with a control polarity and a second diode connected in series and connected to both ends of series elements of the first diode and the insulated gate bipolar transistor, a step-up capacitor connected between a cathode of the first diode and an anode of the second diode, a charge means for charging the step-up capacitor so as to give a high voltage to a terminal on the side connected to a cathode of the flash discharge tube, a gate means for actuating an on action of the control switch element in response to a flash start signal, a drive control means for turning on the insulated gate bipolar transistor by supplying an on voltage to the control polarity of the insulated gate bipolar transistor in response to a flash start signal and turn off the insulated gate bipolar transistor by stopping the supplying of the on voltage in response to a flash stop signal, and a trigger circuit by which the flash discharge tube is excited.

2. A strobo device according to claim 1, wherein the gate means is formed of a discharge circuit having a plurality of resistances which are connected in series to both ends of the second diode, and the connections between the resistances are connected to the control polarity of the control switch element.

3. A strobo device according to claim 1, wherein the gate means is a gate circuit having an input terminal to which flash start signals and flash stop signals are supplied, a standard power supply terminal to which an appropriate standard voltage is applied, a switch circuit including a first switch element connected between the standard power supply terminal and the control polarity of the control switch element and a second switch element connected to the input terminal so as to control the operation of the first switch element in response to the signal supplied to the input terminal.

4. A strobo device according to claim 1, wherein the charge means includes a second diode and a charge resistance connected to both ends of the series elements having the flash discharge tube and the first diode.

5. A strobo device according to claim 1, wherein the charge means includes a second diode and the charge resistance connected to both ends of the flash discharge tube.

6. A strobo device comprising a DC high voltage power supply, a main capacitor connected to both ends of the DC high voltage power supply, first series connection elements having the flash discharge tube, a plurality of first diodes and an insulate gate bipolar transistor connected in series, connected to both ends of the main capacitor, and forming a discharge passage of the main capacitor via the flash discharge tube, a plurality of second series connection elements having plurality of first control switch elements with control polarities and a plurality of second diodes connected in series one by one, respectively, and connected between each anode of the first diodes and a collector of the insulated gate bipolar transistor, plurality of step-up capacitors connected between each cathode of the first diodes and each anode of the second diodes, a charge means for charging a plurality of step-up capacitors so as to give a high potential to the terminal on the side connected to the cathode of the flash discharge tube, a gate means for actuating an on action of a plurality of the control switch elements in response to the flash start signals, a drive control means for turning on the insulated gate bipolar transistor by supplying an on voltage to the control polarity of the insulated gate bipolar transistor in response to the flash start signal and turn off the insulated gate bipolar transistor by stopping the supplying of the on voltage in response to the flash stop signal, and a trigger circuit by which the flash discharge tube is excited.

7. A strobo device according to claim 6, wherein the gate means is formed by a plurality of the discharge circuits in which a plurality of resistances are connected to both ends of a plurality of the second diodes in series, and the connections between the plurality of the resistances are connected to the control polarities of the control switch elements.

8. A strobo device according to claim 6, wherein the charge means includes a plurality of the first and the second diodes and the charge resistances connected to the both ends of the flash discharge tube.

9. A strobo device according to claim 6, wherein the gate means is a gate circuit having an input terminal to which flash start/stop signals are supplied, a standard power supply terminal to which an appropriate standard voltage is applied, and a switch circuit including the first switch element connected between the standard power supply terminal and the control polarity of the control switch element and the second switch element connected to the input terminal to control the first switch element in response to the signals supplied to the input terminal.

10. A strobo device comprising a DC high voltage power supply, a main capacitor connected to both ends of the DC high voltage power supply, first series connection elements consisting a flash discharge tube, a first diode and an insulated gate bipolar transistor connected in series, connected to both ends of the main capacitor, and forming a discharge passage of the main capacitor via the flash discharge tube, series element having a plurality of the third diodes connected in series and connected to both ends of the first diode, a plurality of the second series connection elements having a plurality of control switch elements with control polarities and a plurality of the second diodes one by one, respectively, connected in series, and connected between the anodes of the plurality of the third diodes and collector of the insulated gate bipolar transistor, respectively, a plurality of step-up capacitors connected between each cathode of the plurality of the third diodes and each anode of the plurality of the second diodes, a charge means for charging the plurality of the step-up capacitors so as to give a high potential to the terminal on the side connected to the cathode of the flash discharge tube, a gate means for actuating an on action of the plurality of the control switch elements in response to the flash start signal, a drive control means for turning on the insulated gate bipolar transistor by supplying on voltage to the control polarity of the insulated gate bipolar transistor in response to the flash start signal and turn off the insulated gate bipolar transistor by stopping the supplying of the on voltage in response to the flash stop signal, and a trigger circuit by which the flash discharge tube is excited.

11. A strobo device according to claim 10, wherein the gate means are resistance connection elements in which plurality of resistances are connected and consist of a plurality of discharge circuits connected to both ends of each of the plurality of second diodes, and the connections between the plurality of resistances are connected to the control polarity of the control switch element.

12. A strobo device according to claim 10, wherein the gate means is a gate circuit having an input terminal to which flash start/stop signals are supplied, a standard power supply terminal to which an appropriate standard voltage is applied, and a switch circuit including the first switch element connected between the standard power supply terminal and the control polarity of the control switch element and the second switch element connected to the input terminal to control the first switch element in response to the signals supplied to the input terminal.

13. A strobo device according to claim 10, wherein the charge means includes a plurality of the second and the third diodes and the charge resistances connected to the both ends of the flash discharge tube.

14. A strobo device, comprising a DC high voltage power supply, a main capacitor which is connected to both ends of the DC high voltage power supply, first series connection elements having a flash discharge tube, a first diode and an insulated gate bipolar transistor connected in series, connected to both ends of the main capacitor and forming a discharge passage of the main capacitor via the flash discharge tube, second series connection elements having a first control switch element with a control polarity and a second diode connected in series and connected to both ends of series elements of the first diode and the insulated gate bipolar transistor, a step-up capacitor one end of the other end of which is connected to a collector of the insulated gate bipolar transistor via the second control switch element with a control polarity, a backflow prevent diode the anode of which is connected to the cathode of the flash discharge tube directly or indirectly and the cathode of which is connected to the other end of the step-up capacitor, a charge means for charging the step-up capacitor via the second diode so as to give a high potential to the terminal on the side connected to the cathode of the flash discharge tube via the backflow prevent diode, a switch control means which works in response to a flash start signal and actuates an on action of the first and the second control switch element, a drive control means for turning on the insulated gate bipolar transistor by supplying an on voltage to the control polarity of the insulated gate bipolar transistor in response to start of the DC high voltage power supply and turn off the insulated gate bipolar transistor by stopping supplying the on voltage in response to a flash stop signal, and a trigger circuit by which the flash discharge tube is excited.

15. A strobo device according to claim 14, wherein the charge means consists of the second diode and the charge resistance, one end of which is connected to the high potential terminal of the main capacitor, and the other end of which is connected to a connection between the step-up capacitor and the backflow prevent diode.

16. A strobo device according to claim 14, wherein an anode of the backflow prevent diode is connected to a cathode of the first diode, and the step-up capacitor and the cathode of the flash discharge tube are connected to the first diode via the backflow prevent diode.

17. A strobo device according to claim 14, wherein an anode of the backflow prevent diode is connected to a cathode of the flash discharge tube, and the step-up capacitor is connected to a cathode of the flash discharge tube via the backflow prevent diode.

18. A strobo device according to claim 14, wherein the switch control means comprises an operation control circuit which is actuated by receiving a flash start signal and supplies an on voltage to a control polarity of the second control switch element, and a gate means which is a gate circuit having an input terminal to which flash start/stop signals are supplied, a standard power supply terminal to which an appropriate standard voltage is applied, and a switch circuit including the first switch element connected between the standard power supply terminal and the control polarity of the first control switch element and the second switch element connected to the input terminal to control the first switch element in response to the signals supplied to the input terminal.

19. A strobo device according to claim 14, wherein the switch control means comprises an operation control circuit which is actuated by receiving a flash start signal and supplies an on voltage to a control polarity of the second control switch element, and a gate means which is a gate circuit including a standard power supply terminal to which an appropriate standard voltage is applied, a switch element which is connected between the standard power supply terminal and the control polarity of the first control switch element, and a diode, a cathode of which is connected to a connection between the second control switch element and the step-up capacitor, an anode of which is connected to the control polarity of the switch element.

20. A strobo device according to claim 14, wherein the switch control means comprises an operation control circuit which is actuated by receiving a flash start signal and supplies an on voltage to a control polarity of the second control switch element, and a gate means which is a gate circuit including a standard power supply which outputs an appropriate standard voltage, a switch element connected between the output terminal of the standard power supply and the control polarity of the first control switch element and a capacitor, one end of which is connected to a connection between the second control switch element and the step-up capacitor, the other end of which is connected to the control polarity of the switch element.

21. A strobo device according to claim 14, wherein the gate means is a gate circuit having the standard power voltage outputting an appropriate standard voltage, a switch element connected between the output terminal of the standard power supply and the control polarity of the control switch element, an emitter of which is connected to the control polarity of the first control switch element, and the collector of which is connected to the standard power supply via the first resistance, and the second resistance connected between the base of the npn-type transistor and the terminal with a low potential of the main capacitor.

22. A strobo device according to claim 21, wherein the switch element is an npn-type transistor.

* * * * *

UNITED STATES PATENT AND TRADEMARK OFFICE

CERTIFICATE OF CORRECTION

PATENT NO. : 5,180,953

DATED : January 19, 1993

INVENTOR(S) : Shinji Hirata et al

It is certified that error appears in the above-indentified patent and that said Letters Patent is hereby corrected as shown below:

The sheets of drawing consisting of Fig.2,3,4,10,11and 12 should be deleted and replaced with the following figs,2,3,4,10,11 and 12 as shown on the attached page.

UNITED STATES PATENT AND TRADEMARK OFFICE
CERTIFICATE OF CORRECTION

PATENT NO. : 5,180,953

DATED : January 19, 1993

INVENTOR(S) : Shinji Hirata et al

It is certified that error appears in the above-identified patent and that said Letters Patent is hereby corrected as shown below:

Column 20, line 13, claim 14, insert --which is connected to an anode of the second diode and --after the words "one end of".

Signed and Sealed this

Seventh Day of December, 1993

Attest:

BRUCE LEHMAN

*Attesting Officer*

*Commissioner of Patents and Trademarks*